United States Patent
Liu et al.

(10) Patent No.: US 10,935,653 B2
(45) Date of Patent: Mar. 2, 2021

(54) MULTI-TARGET TRACKING METHOD AND TRACKING SYSTEM APPLICABLE TO CLUTTER ENVIRONMENT

(71) Applicant: SHENZHEN UNIVERSITY, Shenzhen (CN)

(72) Inventors: Zongxiang Liu, Shenzhen (CN); Liangqun Li, Shenzhen (CN); Weixin Xie, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 180 days.

(21) Appl. No.: 16/236,603

(22) Filed: Dec. 30, 2018

(65) Prior Publication Data

US 2020/0025909 A1    Jan. 23, 2020

Related U.S. Application Data

(63) Continuation of application No. PCT/CN2016/099036, filed on Sep. 14, 2016.

(51) Int. Cl.
  *G01S 13/72*    (2006.01)
  *G01S 13/538*    (2006.01)

(52) U.S. Cl.
  CPC .......... *G01S 13/726* (2013.01); *G01S 13/538* (2013.01)

(58) Field of Classification Search
  CPC .............................. G01S 13/726; G01S 13/538
  See application file for complete search history.

(56) References Cited

U.S. PATENT DOCUMENTS

| | | | | |
|---|---|---|---|---|
| 8,670,604 | B2* | 3/2014 | Eggert | G06T 7/251 |
| | | | | 382/131 |
| 10,254,758 | B2* | 4/2019 | Wyffels | G06K 9/6278 |
| 2008/0259163 | A1* | 10/2008 | Yu | G06K 9/6226 |
| | | | | 348/169 |
| 2010/0322480 | A1* | 12/2010 | Banerjee | G06K 9/4661 |
| | | | | 382/103 |
| 2011/0169951 | A1* | 7/2011 | Claxton | G06K 9/6293 |
| | | | | 348/143 |
| 2013/0006576 | A1* | 1/2013 | Mathews | G06K 9/629 |
| | | | | 702/150 |
| 2013/0006577 | A1* | 1/2013 | Mathews | G01S 13/726 |
| | | | | 702/150 |
| 2014/0072233 | A1* | 3/2014 | Horwood | G01S 13/726 |
| | | | | 382/201 |
| 2014/0324339 | A1* | 10/2014 | Adam | G01S 13/726 |
| | | | | 701/519 |

FOREIGN PATENT DOCUMENTS

| | | |
|---|---|---|
| CN | 101975575 A | 2/2011 |
| CN | 103902829 A | 7/2014 |
| | (Continued) | |

*Primary Examiner* — Marcus E Windrich

(57) ABSTRACT

A multi-target tracking method applicable to a cluttered environment includes a prediction step, a classification step, an updating step, a pruning and extracting step, a generation step, a supplement step and a combining step. A multi-target tracking system applicable to a cluttered environment is also provided. The present invention has the characteristic of a fast processing speed, and at the same time, effectively solves the problem that the existing method fails to provide state estimation for a new target in the initial few moments after the new target appears.

9 Claims, 4 Drawing Sheets

(56) References Cited

FOREIGN PATENT DOCUMENTS

| | | |
|---|---|---|
| CN | 104318059 A | 1/2015 |
| CN | 104867163 A | 8/2015 |
| CN | 105719312 A | 6/2016 |
| CN | 106405538 A | 2/2017 |
| WO | 2018/049602 A1 | 3/2018 |

\* cited by examiner

MULTI-TARGET TRACKING METHOD AND TRACKING SYSTEM APPLICABLE TO CLUTTER ENVIRONMENT

CROSS REFERENCE TO RELATED APPLICATIONS

This non-provisional patent application is a continuation application of International Application PCT/CN2016/099036, filed on Sep. 14, 2016, the contents of which are incorporated herein by reference.

TECHNICAL FIELD

The invention relates to the field of multi-sensor information fusion technology, in particular to a multi-target tracking method and a tracking system applicable to a clutter environment.

BACKGROUND

Bayesian filtering technology provides a powerful tool of statistical method for the fusion and processing of multi-sensor information in clutter environments and case of uncertain measurement data. Available multi-target tracking methods for the clutter environment mainly include: a target tracking method based on the Gaussian mixture probability hypothesis density filter and the measurement-driven target tracking method for propagating marginal distribution. The main problem of these two target tracking methods is that the amount of calculation is large, and the state estimations at the initial few moments after the new target appears cannot be provided. How to effectively provide the state estimations of the new target at the initial few moments after its appearance and reduce the amount of calculation is a key technical issue that needs to be explored and solved in the multi-target Bayesian filtering method.

SUMMARY OF THE INVENTION

An object of the present invention is to provide a multi-target tracking method and system applicable to a clutter environment, which aims to solve the problem that the state estimations of a new target at the initial few moments after appearance of the new target cannot be provided and the problem of large calculations.

In one aspect, the present invention provides a multi-target tracking method applicable to a clutter environment, which mainly comprises:

a prediction step, using marginal distribution and existence probability of each target at the previous moment, and time interval between the current moment and the previous moment to predict the marginal distribution and existence probability of each existing target at the current moment;

wherein k−1 represents the previous moment, k represents the current moment, $t_{k-1}$ represents the time of the previous moment, $t_k$ represents the time of the current moment, and the marginal distribution and existence probability of the target i at moment k−1 are represented as $N(x_{i,k-1}; m_{i,k-1}, P_{i,k-1})$ and $\rho_{i,k-1}$, respectively, wherein N represents a Gaussian distribution, i=1,2, ... $N_{k-1}$, $x_{i,k-1}$ is the state vector of the target i at moment k−1, $m_{i,k-1}$ and $P_{i,k-1}$ represent the state mean and covariance of the target i at moment k−1, respectively, and $N_{k-1}$ is the total number of the targets at the previous moment;

based on the marginal distribution $N(x_{i,k-1}; m_{i,k-1}, P_{i,k-1})$ and the existence probability $\rho_{i,k|k-1}$ of target i at moment k−1, the predicted marginal distribution and existence probability of existing target i at moment k are given by $N(x_{i,k}; m_{i,k|k-1}, P_{i,k|k-1})$ and $\rho_{i,k|k-1}$, respectively, where $m_{i,k|k-1}=F_{i,k|k-1}m_{i,k-1}$, $P_{i,k|k-1}=Q_{i,k-1}+F_{i,k|k-1}P_{i,k-1}(F_{i,k|k-1})^T$, $\rho_{i,k|k-1}=p_{S,k}(\Delta t_k)\rho_{i,k-1}$, $F_{i,k|k-1}$ is the state transition matrix, superscript T denotes transpose of matrix or vector, $\Delta t_k = t_k - t_{k-1}$ is the time interval between moments k and k−1, $Q_{i,k-1}$ is the covariance matrix of process noise, $p_{S,k}(\Delta t_k)$ is the surviving probability of the target and $$p_{S,k}(\Delta t_k) = \exp\left(-\frac{\Delta t_k}{\delta \cdot T}\right),$$

T is the sampling period, δ is a given parameter and i=1,2, ... $N_{k-1}$;

a classification step, which uses the predicted marginal distribution and predicted existence probability of each existing target at the current moment to determine whether each measurement in the measurement set originates from the existing targets and split the measurements in the measurement set into two categories: the first category and the second category;

an updating step, which uses the predicted marginal distribution and predicted existence probability of each existing target at the current moment and the first category of measurements as well as the Bayesian rule to obtain the updated marginal distribution and updated existence probability of each existing target at the current moment;

a pruning and extracting step, which is used to eliminate the target whose existence probability is less than a first threshold, and extract the marginal distribution of the target whose existence probability is greater than a second threshold as the output of the current moment according to the updated marginal distribution and updated existence probability of each existing target at the current moment;

a generation step, which uses the second category of measurements at the current moment and the second category of measurements at the previous two moments to generate new targets, and estimate the state mean, covariance and marginal distribution of each new target at the current moment by using the least square method;

a supplement step, which is used to extract the marginal distribution of the new target at the current moment to supplement the output of the current moment, and extract the state estimations of the new target at the previous two moments to supplement the outputs of the previous two moments, respectively;

a combining step, which is used to combine the marginal distribution and existence probability of the remaining targets after the pruning and extracting step with the marginal distribution and existence probability of the new targets in the generation step, respectively, to form the marginal distribution and existence probability of each target at the current moment, which is used as the input of the next recursion.

Preferably, the classification step specifically includes: using the predicted marginal distributions $N(x_{i,k}; m_{i,k|k-1}, P_{i,k|k-1})$ and predicted existence probabilities $\rho_{i,k|k-1}$ at moment k where i=1,2, ... $N_{k-1}$ to determine whether the $j^{th}$ measurement $y_{j,k}$ in measurement set $y_k=(y_{1,k}, ..., y_{M_k,k})$ at moment k originates from the existing targets and classify the $j^{th}$ measurement into either the first category or the second category, wherein sub-steps for determining and classifying comprises:

sub-step A, which is used to obtain the probability $\rho_j^c$ as $$\rho_j^c = \frac{\lambda_{c,k}}{\lambda_{c,k} + p_{D,k} \sum_{e=1}^{N_{k-1}} \rho_{e,k|k-1} N(y_{j,k}; H_k m_{k|k-1}^e, H_k P_{k|k-1}^e H_k^T + R_k)},$$

where $H_k$ is the observation matrix, $R_k$ is the covariance matrix of observed noise, $p_{D,k}$ is the detection probability of the target, $\lambda_{c,k}$ is the clutter density; and sub-step B, which uses a rule to classify measurement $y_{j,k}$ into two categories, the used rule is that if $\rho_j^c \leq 0.5$ then classify measurement $y_{j,k}$ into the first category and if $\rho_j^c > 0.5$ then classify measurement $y_{j,k}$ into the second category; Using above rule to process each measurement in measurement set $y_k = (y_{1,k}, \ldots, y_{M_k,k})$, the measurements in the measurement set $y_k$ being divided into two categories, the measurements in the first category being the measurements from the existing targets, which are expressed as $y_k^m = (y_{1,k}^m, \ldots, y_{M_{1,k},k}^m)$, and the measurements in second category being other measurements, which are expressed as $y_k^c = (y_{1,k}^c, \ldots, y_{M_{2,k},k}^c)$, where $M_{1,k}$ and $M_{2,k}$ are the number of measurements in the first category and the number of measurements in the second category, respectively, and $M_{1,k} + M_{2,k} = M_k$.

Preferably, the updating step specifically includes: using the predicted marginal distributions $N(x_{i,k}; m_{i,k|k-1}, P_{i,k|k-1})$ and predicted existence probabilities $\rho_{i,k|k-1}$ of the individual existing targets at moment k where $i = 1, 2, \ldots N_{k-1}$, and the first category of measurements $y_k^m = (y_{1,k}^m, \ldots, y_{M_{1,k},k}^m)$ at moment k as well as the Bayesian rule to obtain the updated marginal distribution and updated existence probability of each existing target at moment k, wherein, sub-steps for obtaining the updated marginal distribution and existence probability of each existing target at moment k include:

sub-step C, which uses the Bayesian rule to process measurement $y_{j,k}^m$ to obtain existence probability $$\rho_{i,k}^{a,j} = \frac{p_{D,k} \rho_{i,k|k-1} N(y_{j,k}^m; H_k m_{k|k-1}^i, H_k P_{k|k-1}^i H_k^T + R_k)}{\lambda_{c,k} + p_{D,k} \sum_{e=1}^{N_{k-1}} \rho_{e,k|k-1} N(y_{j,k}^m; H_k m_{k|k-1}^e, H_k P_{k|k-1}^e H_k^T + R_k)},$$

mean vector $m_{i,k}^{a,j} = m_{k|k-1}^i + A_i \cdot (y_{j,k}^m - H_k m_{k|k-1}^i)$ and covariance matrix $P_{i,k}^{a,j} = (I - A_i \cdot H_k) P_{k|k-1}^i$ of target i corresponding to the measurement $y_{j,k}^m$, where $A_i = P_{k|k-1}^i H_k^T [H_k P_{k|k-1}^i H_k^T + R_k]^{-1}$; after each measurement in the first category is processed, the updated marginal distribution and existence probability of each existing target corresponding to each measurement are $N(x_{i,k}; m_{i,k}^{a,j}, P_{i,k}^{a,j})$ and $\rho_{i,k}^{a,j}$, where $i = 1, \ldots, N_{k-1}$, $j = 1, \ldots, M_{1,k}$; and sub-step D, letting $$q = \arg\max_{j \in \{1, \ldots, M_{1,k}+1\}} \{\rho_{i,k}^{a,j}\}$$

where $\rho_{i,k}^{a,M_{1,k}+1} = \rho_{i,k|k-1}$, then the updated marginal distribution of existing target i at moment k being given by $N(x_{i,k}; m_{i,k}, P_{i,k}) = N(x_{i,k}; m_{i,k}^{a,q}, P_{i,k}^{a,q})$ and the corresponding existence probability being given by $\rho_{i,k} = \rho_{i,k}^{a,q}$, where $i = 1, \ldots, N_{k-1}$, $m_{i,k}^{a,M_{1,k}+1} = m_{i,k|k-1}$ and $P_{i,k}^{a,M_{1,k}+1} = P_{i,k|k-1}$ when $q = M_{1,k}+1$.

Preferably, the generation step specifically includes: using the second category of measurements $y_k^c = (y_{1,k}^c, \ldots, y_{M_{2,k},k}^c)$ at moment k, the second category of measurements $y_{k-1}^c = (y_{1,k-1}^c, \ldots, y_{M_{2,k-1},k-1}^c)$ at moment k-1 and the second category of measurements $y_{k-2}^c = (y_{1,k-2}^c, \ldots, y_{M_{2,k-2},k-2}^c)$ at moment k-2 to generate new targets and estimate the state mean, covariance and marginal distribution of each new target at moment k by using the least square method.

wherein, sub-steps for generating the new target and estimating the state mean, covariance matrix and marginal distribution of the new target at moment k include:

sub-step E, first picking measurement $y_{e,k-2}^c$ from set $y_{k-2}^c = (y_{1,k-2}^c, \ldots, y_{M_{2,k-2},k-2}^c)$, measurement $y_{f,k-1}^c$ from set $y_{k-1}^c = (y_{1,k-1}^c, \ldots, y_{M_{2,k-1},k-1}^c)$ and measurement $y_{g,k}^c$ from set $y_k^c = (y_{1,k}^c, \ldots, y_{M_{2,k},k}^c)$, respectively; then obtaining $v_{f,e}$, $v_{g,f}$, $a_{g,f,e}$ and $c_{g,f,e}$ as $$v_{f,e} = \frac{\|y_{f,k-1}^c - y_{e,k-2}^c\|_2}{\Delta t_{k-1}},$$

$$v_{g,f} = \frac{\|y_{g,k}^c - y_{f,k-1}^c\|_2}{\Delta t_k},$$

$$a_{g,f,e} = \frac{|v_{g,f} - v_{f,e}|}{\Delta t_k} \text{ and}$$

$$c_{g,f,e} = \frac{(y_{g,k}^c - y_{f,k-1}^c, y_{f,k-1}^c - y_{e,k-2}^c)}{\|y_{f,k-1}^c - y_{e,k-2}^c\|_2 \times \|y_{g,k}^c - y_{f,k-1}^c\|_2},$$

where $e = 1, \ldots, M_{2,k-2}$, $f = 1, \ldots, M_{2,k-1}$, $g = 1, \ldots, M_{2,k}$, $\|\cdot\|_2$ represents the 2 norm of the vector, $|\cdot|$ represents the absolute value, $(\cdot, \cdot)$ represents the pot product of two vectors; and sub-step F, which is used to judge whether the four requirements $v_{min} \leq v_{f,e} \leq v_{max}$, $v_{min} \leq v_{g,f} \leq v_{max}$, $a_{g,f,e} \leq a_{max}$ and $c_{g,f,e} \geq c_{min}$ are satisfied, where $v_{min}$, $v_{max}$, $a_{max}$ and $c_{min}$ are four given parameters, which denote the minimum speed, the maximum speed, the maximum acceleration and the minimum value of angle cosine, respectively; if the above four requirements are satisfied, then use measurements $y_{e,k-2}^c$, $y_{f,k-1}^c$ and $y_{g,k}^c$ as well as the least square method to obtain state mean $m_{\gamma,k}^i$, covariance $P_{\gamma,k}^i$ and marginal distribution $N(x_{i,k}; m_{\gamma,k}^i, P_{\gamma,k}^i)$ of the new target at moment k, where $m_{\gamma,k}^i = (C^T C)^{-1} C^T Y$, $P_{\gamma,k}^i = (C^T C)^{-1} C^T R C (C^T C)^{-1}$, $$C = \begin{bmatrix} 1 & -(\Delta t_{k-1} + \Delta t_k) & 0 & 0 \\ 0 & 0 & 1 & -(\Delta t_{k-1} + \Delta) \\ 1 & -\Delta t_k & 1 & 0 \\ 0 & 0 & 1 & -\Delta t_k \\ 1 & 0 & 0 & 0 \\ 0 & 0 & 1 & 0 \end{bmatrix},$$

$$y = \begin{bmatrix} y_{e,k-2}^c \\ y_{f,k-1}^c \\ y_{g,k}^c \end{bmatrix},$$

-continued $$R = \begin{bmatrix} \sigma_w^2 & 0 & 0 & 0 & 0 & 0 \\ 0 & \sigma_w^2 & 0 & 0 & 0 & 0 \\ 0 & 0 & \sigma_w^2 & 0 & 0 & 0 \\ 0 & 0 & 0 & \sigma_w^2 & 0 & 0 \\ 0 & 0 & 0 & 0 & \sigma_w^2 & 0 \\ 0 & 0 & 0 & 0 & 0 & \sigma_w^2 \end{bmatrix},$$

$\sigma_w$ is the standard deviation of the measured noise; at the same time, the existence probability of the new target is given as $\rho_\gamma^i = 0.9$, the state estimation of the new target at moment k−1 is given as $m_{\gamma,k-1}^i = (C_1^T C_1)^{-1} C_1^T Y$, where $$C_1 = \begin{bmatrix} 1 & -\Delta t_{k-1} & 0 & 0 \\ 0 & 0 & 1 & -\Delta t_{k-1} \\ 1 & 0 & 0 & 0 \\ 0 & 0 & 1 & 0 \\ 1 & \Delta t_k & 0 & 0 \\ 0 & 0 & 1 & \Delta t_k \end{bmatrix},$$

and the state estimation of the new target at moment k−2 is given as $m_{\gamma,k-2}^i = (C_2^T C_2)^{-1} C_2^T Y$ where $$C_2 = \begin{bmatrix} 1 & 0 & 0 & 0 \\ 0 & 0 & 1 & 0 \\ 1 & \Delta t_k & 0 & 0 \\ 0 & 0 & 1 & \Delta t_k \\ 1 & \Delta t_{k-1} + \Delta t_k & 0 & 0 \\ 0 & 0 & 1 & \Delta t_{k-1} + \Delta t_k \end{bmatrix}.$$

In another aspect, the present invention also provides a multi-target tracking system applicable to a clutter environment, the system comprising:

a prediction module, configured to use marginal distribution and existence probability of each target at the previous moment, and time interval between the current moment and previous moment to predict the marginal distribution and existence probability of each existing target at the current moment, wherein k−1 represents the previous moment, k represents the current moment, $t_{k-1}$ represents the time of the previous moment, $t_k$ represents the time of the current moment, and the marginal distribution and existence probability of the target i at moment k−1 are represented as $N(x_{i,k-1}; m_{i,k-1}, P_{i,k-1})$ and $\rho_{i,k-1}$, respectively, wherein N represents a Gaussian distribution, i=1,2, . . . $N_{k-1}$, $x_{i,k-1}$ is the state vector of the target i at moment k−1, $m_{i,k-1}$ and $P_{i,k-1}$ represent the state mean and covariance of the target i at moment k−1, respectively, and $N_{k-1}$ is the total number of the targets at the previous moment, based on the marginal distribution $N(x_{i,k-1}; m_{i,k-1}, P_{i,k-1})$ and the existence probability $\rho_{i,k|k-1}$ of target i at moment k−1, the predicted marginal distribution and existence probability of existing target i at moment k are given by $N(x_{i,k}; m_{i,k|k-1}, P_{i,k|k-1})$ and $\rho_{i,k|k-1}$, respectively, where $m_{i,k|k-1} = F_{i,k|k-1} m_{i,k-1}$, $P_{i,k|k-1} = Q_{i,k-1} + F_{i,k|k-1} P_{i,k-1} (F_{i,k|k-1})^T$, $\rho_{i,k|k-1} = p_{S,k}(\Delta t_k) \rho_{i,k-1}$, $F_{i,k|k-1}$ is the state transition matrix, superscript T denotes transpose of matrix or vector, $\Delta t_k = t_k - t_{k-1}$ is the time interval between moments k and k−1, $Q_{i,k-1}$ is the covariance matrix of process noise, $p_{S,k}(\Delta t_k)$ is the surviving probability of the target and $$p_{S,k}(\Delta t_k) = \exp\left(-\frac{\Delta t_k}{\delta \cdot T}\right),$$

T is the sampling period, δ is a given parameter and i=1,2, . . . $N_{k-1}$;

a classification module, configured to use the predicted marginal distribution and predicted existence probability of each existing target at the current moment to determine whether each measurement in the measurement set originates from the existing targets and split the measurements in the measurement set into two categories: the first category and the second category;

an update module, configured to use the predicted marginal distribution and predicted existence probability of each existing target at the current moment and the first category of measurements as well as the Bayesian rule to obtain the updated marginal distribution and updated existence probability of each existing target at the current moment;

a pruning and extracting module, configured to eliminate the target whose existence probability is less than a first threshold, and extract the marginal distribution of the target whose existence probability is greater than a second threshold as the output of the current moment according to the updated marginal distribution and updated existence probability of each existing target at the current moment;

a generation module, configured to use the second category of measurements at the current moment and the second category of measurements at the previous two moments to generate new targets, and estimate the state mean, covariance and marginal distribution of each new target at the current moment by using the least square method;

a supplementation module, configured to extract the marginal distribution of the new target at the current moment to supplement the output of the current moment, and extract the state estimations of the new target at the previous two moments to supplement the outputs of the previous two moments, respectively; and a combining module, configured to combine the marginal distribution and existence probability of remaining targets from the pruning and extracting module with the marginal distribution and the existence probability of the new targets generated by the generation module, respectively, to form the marginal distribution and existence probability of each target at the current moment, which is used as the input of the next recursion.

Preferably, the classification module is specifically configured to use predicted marginal distributions $N(x_{i,k}; m_{i,k|k-1}, P_{i,k|k-1})$ and predicted existence probabilities $\rho_{i,k|k-1}$ at moment k where i=1,2, . . . $N_{k-1}$ to determine whether the $j^{th}$ measurement $y_{j,k}$ in measurement set $y_k = (y_{1,k}, \ldots, y_{M_k,k})$ at moment k originates from the existing targets and classify the $j^{th}$ measurement into either the first category or the second category, wherein the classification module includes:

a first sub-module, configured to obtain the probability $\rho_j^c$ as $$\rho_j^c = \frac{\lambda_{c,k}}{\lambda_{c,k} + p_{D,k} \sum_{e=1}^{N_{k-1}} \rho_{e,k|k-1} N(y_{j,k}; H_k m_{k|k-1}^e, H_k P_{k|k-1}^e H_k^T + R_k)},$$

where $H_k$ is the observation matrix, $R_k$ is the covariance matrix of observed noise, $p_{D,k}$ is the detection probability of the target, $\lambda_{c,k}$ is the clutter density; and a second sub-module configured to use a rule to classify measurement $y_{j,k}$ into two categories, the used rule is that if $\rho_j^c \le 0.5$ then classify measurement $y_{j,k}$ into the first category and if $\rho_j^c > 0.5$ then classify measurement $y_{j,k}$ into the second category; Using above rule to process each measurement in measurement set $y_k = (y_{1,k}, \ldots, y_{M_k,k})$, the measurements in the measurement set $y_k$ being divided into two categories, the measurements in the first category being the measurements from the existing targets, which are expressed as $y_k^m = (y_{1,k}^m, \ldots, y_{M_{1,k}}^m)$, and the measurements in second category being other measurements, which are expressed as $y_k^c = (y_{1,k}^c, \ldots, y_{M_{2,k}}^c)$, where $M_{1,k}$ and $M_{2,k}$ are the number of measurements in the first category and the number of measurements in the second category, respectively, and $M_{1,k} + M_{2,k} = M_k$.

Preferably, the updating module is specifically configured to use the predicted marginal distributions $N(x_{i,k}; m_{i,k|k-1}, P_{i,k|k-1})$ and predicted existence probabilities $\rho_{i,k|k-1}$ of the individual existing targets at moment k where $i = 1, 2, \ldots N_{k-1}$, and the first category of measurements $y_k^m = (y_{1,k}^m, \ldots, y_{M_{1,k}}^m)$ at moment k as well as the Bayesian rule to obtain the updated marginal distribution and updated existence probability of each existing target at moment k, wherein the update module comprises:

a third sub-module, configured to use the Bayesian rule to process measurement $y_{j,k}^m$ to obtain existence probability $$\rho_{i,k}^{a,j} = \frac{p_{D,k}\rho_{i,k|k-1}N(y_{j,k}^m; H_k m_{k|k-1}^i, H_k P_{k|k-1}^i H_k^T + R_k)}{\lambda_{c,k} + p_{D,k}\sum_{e=1}^{N_{k-1}} \rho_{e,k|k-1}N(y_{j,k}^m; H_k m_{k|k-1}^e, H_k P_{k|k-1}^e H_k^T + R_k)},$$

mean vector $m_{i,k}^{a,j} = m_{k|k-1}^i + A_i \cdot (y_{j,k}^m - H_k m_{k|k-1}^i)$ and covariance matrix $P_{i,k}^{a,j} = (I - A_i \cdot H_k) P_{k|k-1}^i$ of target i corresponding to the measurement $y_{j,k}^m$, where $A_i = P_{k|k-1}^i H_k^T [H_k P_{k|k-1}^i H_k^T + R_k]^{-1}$; after each measurement in the first category is processed, the updated marginal distribution and existence probability of each existing target corresponding to each measurement are $N(x_{i,k}; m_{i,k}^{a,j}, P_{i,k}^{a,j})$ and $\rho_{i,k}^{a,j}$, where $i = 1, \ldots, N_{k-1}, j = 1, \ldots, M_{1,k}$; and a fourth sub-module, configured to: letting $$q = \arg\max_{j \in \{1, \ldots, M_{1,k}+1\}} \{\rho_{i,k}^{a,j}\}$$

where $\rho_{i,k}^{a,M_{1,k}+1} = \rho_{i,k|k-1}$, then the updated marginal distribution of existing target i at moment k being given by $N(x_{i,k}; m_{i,k}, P_{i,k}) = N(x_{i,k}; m_{i,k}^{a,q}, P_{i,k}^{a,q})$ and the corresponding existence probability being given by $\rho_{i,k} = \rho_{i,k}^{a,q}$, where $i = 1, \ldots, N_{k-1}$, $m_{i,k}^{a,M_{1,k}+1} = m_{i,k|k-1}$ and $P_{i,k}^{a,M_{1,k}+1} = P_{i,k|k-1}$ when $q = M_{1,k} + 1$.

Preferably, the generation module is specifically configured to use the second category of measurements $y_k^c = (y_{1,k}^c, \ldots, y_{M_{2,k}}^c)$ at moment k, the second category of measurements $y_{k-1}^c = (y_{1,k-1}^c, \ldots, y_{M_{2,k-1},k-1}^c)$ at moment k-1 and the second category of measurements $y_{k-2}^c = (y_{1,k-2}^c, \ldots, y_{M_{2,k-2},k-2}^c)$ at moment k-2 to generate new targets and estimate the state mean, covariance and marginal distribution of each new target at moment k by using the least square method.

wherein, the generation module includes:

a fifth sub-module configured to first pick measurement $y_{e,k-2}^c$ from set $y_{k-2}^c = (y_{1,k-2}^c, \ldots, y_{M_{2,k-2},k-2}^c)$, measurement $y_{f,k-1}^c$ from set $y_{k-1}^c = (y_{1,k-1}^c, \ldots, y_{M_{2,k-1},k-1}^c)$ and measurement $y_{g,k}^c$ from set $y_k^c = (y_{1,k}^c, \ldots, y_{M_{2,k},k}^c)$, respectively; then obtain $v_{f,e}$, $v_{g,f}$, $a_{g,f,e}$ and $c_{g,f,e}$ as $$v_{f,e} = \frac{\|y_{f,k-1}^c - y_{e,k-2}^c\|_2}{\Delta t_{k-1}},$$

$$v_{g,f} = \frac{\|y_{g,k}^c - y_{f,k-1}^c\|_2}{\Delta t_k},$$

$$a_{g,f,e} = \frac{|v_{g,f} - v_{f,e}|}{\Delta t_k} \text{ and}$$

$$c_{g,f,e} = \frac{(y_{g,k}^c - y_{f,k-1}^c, y_{f,k-1}^c - y_{e,k-2}^c)}{\|y_{f,k-1}^c - y_{e,k-2}^c\|_2 \times \|y_{g,k}^c - y_{f,k-1}^c\|_2},$$

where $e = 1, \ldots, M_{2,k-2}$, $f = 1, \ldots, M_{2,k-1}$, $g = 1, \ldots, M_{2,k}$, $\|\bullet\|_2$ represents the 2 norm of the vector, $|\bullet|$ represents the absolute value, $(\bullet, \bullet)$ represents the pot product of two vectors; and a sixth sub-module is configured to judge whether the four requirements $v_{min} \le v_{f,e} \le v_{max}$, $v_{min} \le v_{g,f} \le v_{max}$, $a_{g,f,e} \le a_{max}$ and $c_{g,f,e} \ge c_{min}$ are satisfied, where $v_{min}$, $v_{max}$, $a_{max}$ and $c_{min}$ are four given parameters, which denote the minimum speed, the maximum speed, the maximum acceleration and the minimum value of angle cosine, respectively; if the above four requirements are satisfied, then use measurements $y_{e,k-2}^c$, $y_{f,k-1}^c$ and $y_{g,k}^c$ as well as the least square method to obtain state mean $m_{\gamma,k}^i$, covariance $P_{\gamma,k}^i$ and marginal distribution $N(x_{i,k}; m_{\gamma,k}^i, P_{\gamma,k}^i)$ of the new target at moment k, where $m_{\gamma,k}^i = (C^T C)^{-1} C^T Y$, $P_{\gamma,k}^i = (C^T C)^{-1} C^T R C (C^T C)^{-1}$, $$C = \begin{bmatrix} 1 & -(\Delta t_{k-1} + \Delta t_k) & 0 & 0 \\ 0 & 0 & 1 & -(\Delta t_{k-1} + \Delta t_k) \\ 1 & -\Delta t_k & 0 & 0 \\ 0 & 0 & 1 & -\Delta t_k \\ 1 & 0 & 0 & 0 \\ 0 & 0 & 1 & 0 \end{bmatrix},$$

$$Y = \begin{bmatrix} y_{e,k-2}^c \\ y_{f,k-1}^c \\ y_{g,k}^c \end{bmatrix},$$

$$R = \begin{bmatrix} \sigma_w^2 & 0 & 0 & 0 & 0 & 0 \\ 0 & \sigma_w^2 & 0 & 0 & 0 & 0 \\ 0 & 0 & \sigma_w^2 & 0 & 0 & 0 \\ 0 & 0 & 0 & \sigma_w^2 & 0 & 0 \\ 0 & 0 & 0 & 0 & \sigma_w^2 & 0 \\ 0 & 0 & 0 & 0 & 0 & \sigma_w^2 \end{bmatrix},$$

$\sigma_w$ is the standard deviation of the measured noise; at the same time, the existence probability of the new target is given as $\rho_\gamma^i = 0.9$, the state estimation of the new target at moment k-1 is given as $m_{\gamma,k-1}^i = (C_1^T C_1)^{-1} C_1^T Y$, where $$C_1 = \begin{bmatrix} 1 & -\Delta t_{k-1} & 0 & 0 \\ 0 & 0 & 1 & -\Delta t_{k-1} \\ 1 & 0 & 0 & 0 \\ 0 & 0 & 1 & 0 \\ 1 & \Delta t_k & 0 & 0 \\ 0 & 0 & 1 & \Delta t_k \end{bmatrix},$$

and the state estimation of the new target at moment k−2 is given as $m_{\gamma,k-2}{}^i = (C_2{}^T C_2)^{-1} C_2{}^T Y$ where $$C_2 = \begin{bmatrix} 1 & 0 & 0 & 0 \\ 0 & 0 & 1 & 0 \\ 1 & \Delta t_k & 0 & 0 \\ 0 & 0 & 1 & \Delta t_k \\ 1 & \Delta t_{k-1} + \Delta t_k & 0 & 0 \\ 0 & 0 & 1 & \Delta t_{k-1} + \Delta t_k \end{bmatrix}.$$

In another aspect, the present invention further provides a multi-target tracking system applicable to a clutter environment. The tracking system comprises a storage medium storing program modules and a processor configured to execute the program modules. The program modules comprise:

a prediction module, configured to use marginal distribution and existence probability of each target at the previous moment, and time interval between the current moment and the previous moment to predict the marginal distribution and existence probability of each existing target at the current moment;

a classification module, which uses the predicted marginal distribution and predicted existence probability of each existing target at the current moment to determine whether each measurement in the measurement set originates from the existing targets and split the measurements in the measurement set into two categories: the first category and the second category;

an updating module, configured to use the predicted marginal distribution and predicted existence probability of each existing target at the current moment and the first category of measurements as well as the Bayesian rule to obtain the updated marginal distribution and updated existence probability of each existing target at the current moment;

a pruning and extracting module, configured to eliminate the target whose existence probability is less than a first threshold, and extract the marginal distribution of the target whose existence probability is greater than a second threshold as the output of the current moment according to the updated marginal distribution and updated existence probability of each existing target at the current moment;

a generation module, configured to use the second category of measurements at the current moment and the second category of measurements at the previous two moments to generate new targets, and estimate the state mean, covariance and marginal distribution of each new target at the current moment by using the least square method;

a supplement module, configured to extract the marginal distribution of the new target at the current moment to supplement the output of the current moment, and extract the state estimations of the new target at the previous two moments to supplement the outputs of the previous two moments, respectively; and a combining module, configured to combine the marginal distribution and existence probability of remaining targets from the pruning and extracting module with the marginal distribution and the existence probability of the new targets generated by the generation module, respectively, to form the marginal distribution and existence probability of each target at the current moment, which is used as the input of the next recursion.

The technical scheme provided by the present invention may obtain the state estimations of a new target at the initial three moments after the appearance of the new target by predicting, classifying, updating, pruning and extracting, generating, supplementing and combining steps and using the least square method, therefore effectively solves the problem of available method that the state estimations of a new target at the initial few moments after appearance of the new target cannot be provided. The method of the present invention has the characteristics of fast processing speed and a strong applicability, and the calculation amount being significantly smaller than the existing method.

DRAWINGS

Figure 4:
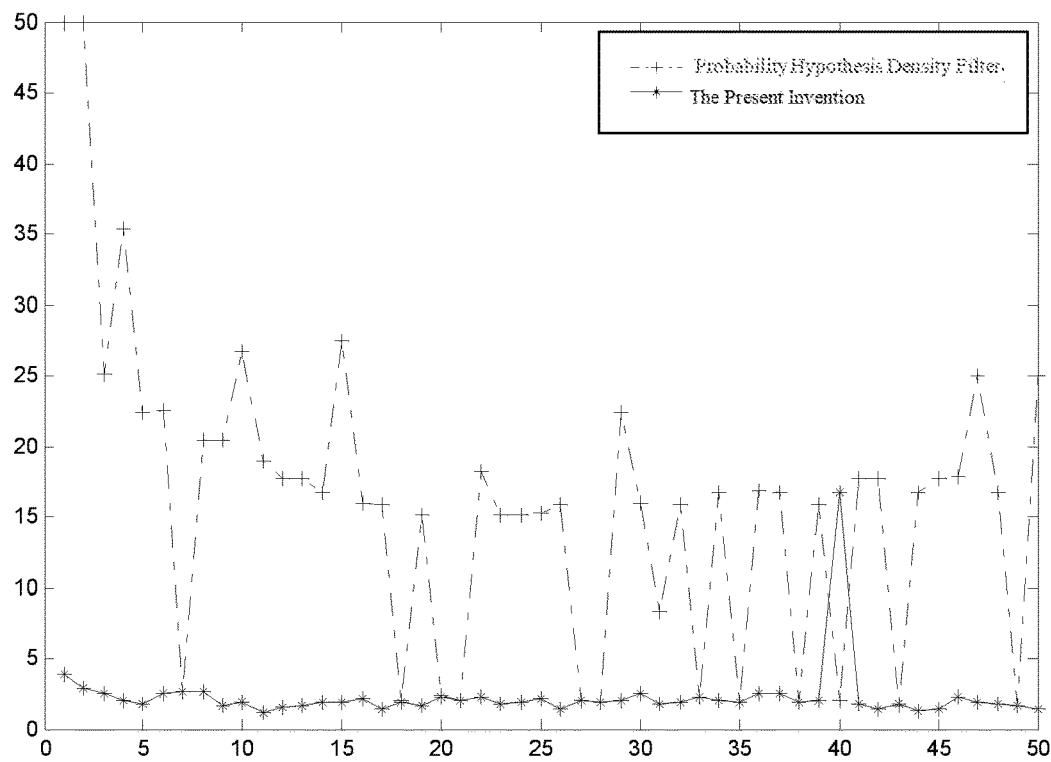
Figure 5:
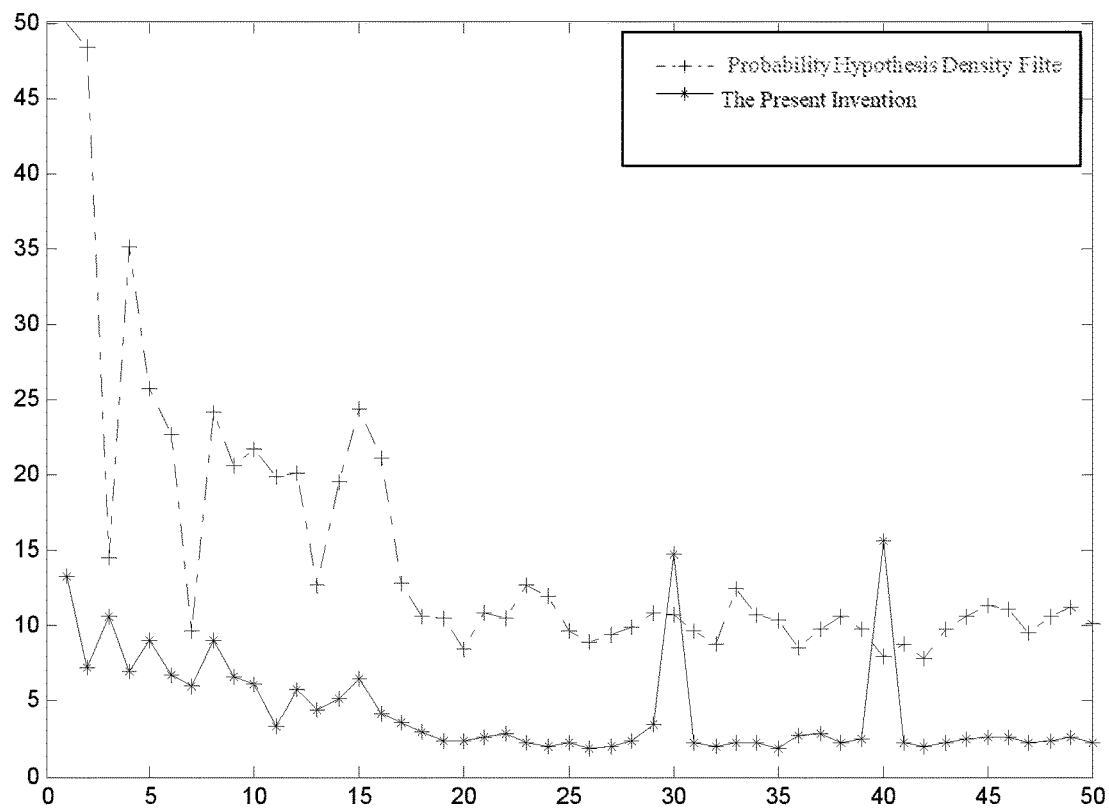

FIG. 4 is a schematic diagram of the optimal sub-pattern assignment (OSPA) distance for an experiment obtained respectively by the Gaussian mixture probability hypothesis density filtering method and the multi-target tracking method applicable to a clutter environment provided by the present invention in an embodiment of the present invention; and FIG. 5 is a schematic diagram of the average OSPA distance for 100 experiments obtained respectively by the Gaussian mixture probability hypothesis density filtering method and the multi-target tracking method applicable to a clutter environment provided by the present invention in an embodiment of the present invention.

DETAILED DESCRIPTION

The present invention will be further described in detail below with reference to the accompanying drawings and embodiments. It is understood that the specific embodiments described herein are merely illustrative of the invention and are not intended to limit the invention.

A multi-target tracking method applicable to a clutter environment provided by the present invention will be described in detail below.

Figure 1:
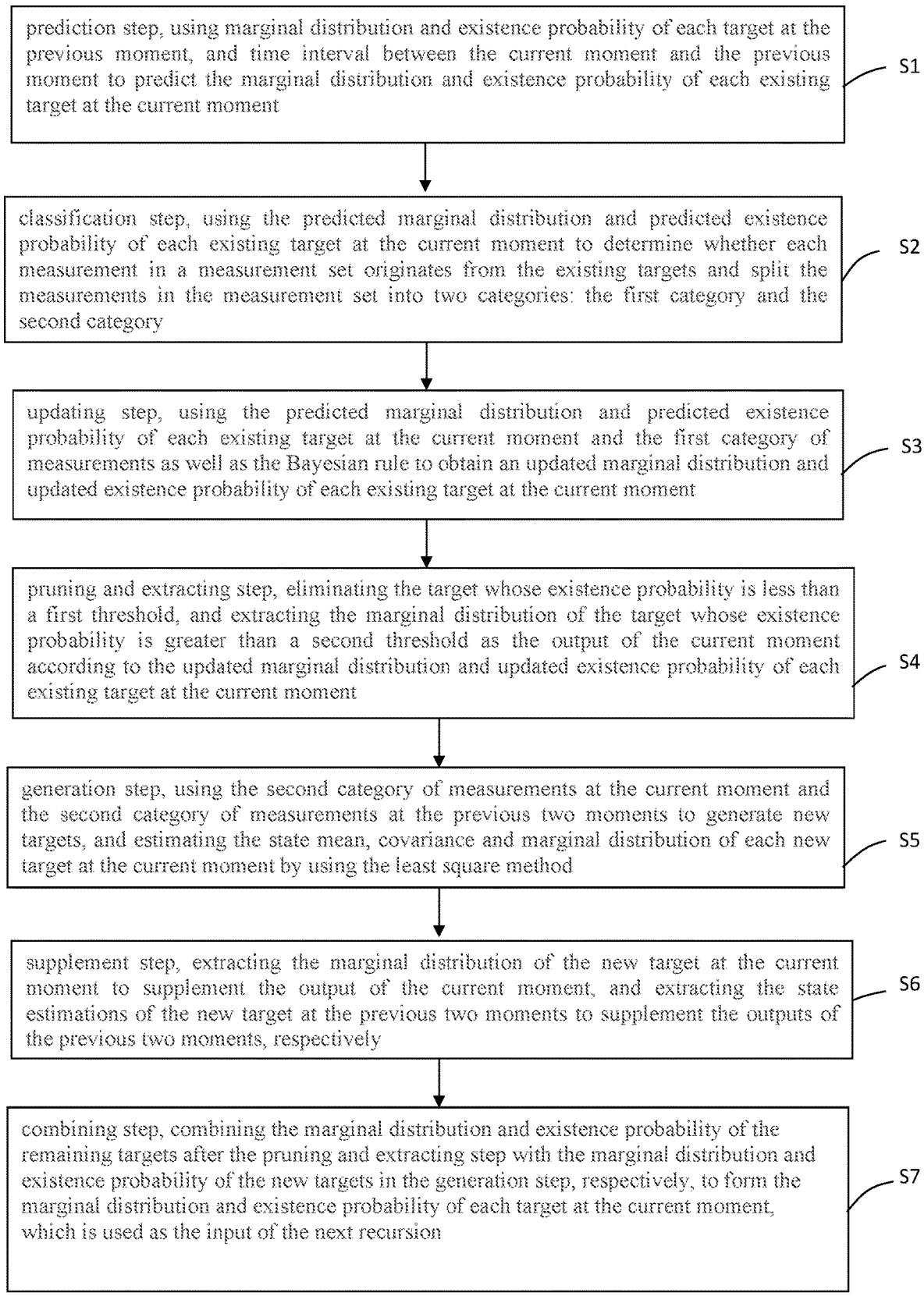
FIG. 1 is a flowchart of a multi-target tracking method applicable to a clutter environment in an embodiment of the present invention.

FIG. 1 is a flowchart of a multi-target tracking method applicable to a clutter environment in an embodiment of the present invention.

In step S1, the prediction step uses marginal distribution and existence probability of each target at the previous moment, and time interval between the current moment and previous moment to predict the marginal distribution and existence probability of each existing target at the current moment.

In this embodiment, the prediction step S1 specifically includes:

wherein k−1 represents the previous moment, k represents the current moment, $t_{k-1}$ represents the time of the previous moment, $t_k$ represents the time of the current moment, and the marginal distribution and existence probability of the target i at moment k−1 are represented as $N(x_{i,k-1}; m_{i,k-1}, P_{i,k-1})$ and $\rho_{i,k-1}$, respectively, wherein N represents a Gaussian distribution, $i=1,2,\ldots N_{k-1}$, $x_{i,k-1}$ is the state vector of the target i at moment k−1, $m_{i,k-1}$ and $P_{i,k-1}$ represent the state mean and covariance of the target i at moment k−1, respectively, and $N_{k-1}$ is the total number of the targets at the previous moment;

based on the marginal distribution $N(x_{i,k-1}; m_{i,k-1}, P_{i,k-1})$ and the existence probability $\rho_{i,k|k-1}$ of target i at moment k−1, the predicted marginal distribution and existence probability of existing target i at moment k are given by $N(x_{i,k}; m_{i,k|k-1}, P_{i,k|k-1})$ and $\rho_{i,k|k-1}$, respectively, where $m_{i,k|k-1}=F_{i,k|k-1}m_{i,k-1}$, $P_{i,k|k-1}=Q_{i,k-1}+F_{i,k|k-1}P_{i,k-1}(F_{i,k|k-1})^T$, $\rho_{i,k|k-1}=p_{S,k}(\Delta t_k)\rho_{i,k-1}$, $F_{i,k|k-1}$ is the state transition matrix, superscript T denotes transpose of matrix or vector, $\Delta t_k = t_k - t_{k-1}$ is the time interval between moments k and k−1, $Q_{i,k-1}$ is the covariance matrix of process noise, $p_{S,k}(\Delta t_k)$ is the surviving probability of the target and $$p_{S,k}(\Delta t_k) = \exp\left(-\frac{\Delta t_k}{\delta \cdot T}\right),$$

T is the sampling period, δ is a given parameter and $i=1,2,\ldots N_{k-1}$.

In step S2, the classification step uses the predicted marginal distribution and predicted existence probability of each existing target at the current moment to determine whether each measurement in the measurement set originates from the existing targets and split the measurements in the measurement set into two categories: the first category and the second category.

In this embodiment, the classification step S2 specifically includes:

using predicted marginal distributions $N(x_{i,k}; m_{i,k|k-1}, P_{i,k|k-1})$ and predicted existence probabilities $\rho_{i,k|k-1}$ at moment k where $i=1,2,\ldots N_{k-1}$ to determine whether the $j^{th}$ measurement $y_{j,k}$ in measurement set $y_k=(y_{1,k},\ldots,y_{M_k,k})$ at moment k originates from the existing targets and classify the $j^{th}$ measurement into either the first category or the second category, Wherein, the step of determining and classifying comprises:

Sub-step A, which is used to obtain the probability $\rho_j^c$ as $$\rho_j^c = \frac{\lambda_{c,k}}{\lambda_{c,k} + p_{D,k}\sum_{e=1}^{N_{k-1}}\rho_{e,k|k-1}N(y_{j,k}; H_k m^e_{k|k-1}, H_k P^e_{k|k-1}H_k^T + R_k)},$$

where $H_k$ is the observation matrix, $R_k$ is the covariance matrix of observed noise, $p_{D,k}$ is the detection probability of the target, $\lambda_{c,k}$ is the clutter density; and sub-step B, which uses a rule to classify measurement $y_{j,k}$ into two categories, the used rule is that if $\rho_j^c \leq 0.5$ then classify measurement $y_{j,k}$ into the first category and if $\rho_j^c > 0.5$ then classify measurement $y_{j,k}$ into the second category; Using above rule to process each measurement in measurement set $y_k=(y_{1,k},\ldots,y_{M_k,k})$, the measurements in the measurement set $y_k$ being divided into two categories, the measurements in the first category being the measurements from the existing targets, which are expressed as $y_k^m=(y_{1,k}^m,\ldots,y_{M_{1,k},k}^m)$, and the measurements in second category being other measurements, which are expressed as $y_k^c=(y_{1,k}^c,\ldots,y_{M_{2,k},k}^c)$, where $M_{1,k}$ and $M_{2,k}$ are the number of measurements in the first category and the number of measurements in the second category, respectively, and $M_{1,k}+M_{2,k}=M_k$.

In step S3, the updating step uses the predicted marginal distribution and predicted existence probability of each existing target at the current moment and the first category of measurements as well as the Bayesian rule to obtain the updated marginal distribution and updated existence probability of each existing target at the current moment.

In this embodiment, the updating step S3 specifically includes: using the predicted marginal distributions $N(x_{i,k}; m_{i,k|k-1}, P_{i,k|k-1})$ and predicted existence probabilities $\rho_{i,k|k-1}$ of the individual existing targets at moment k where $i=1,2,\ldots N_{k-1}$, and the first category of measurements $y_k^m=(y_{1,k}^m,\ldots,y_{M_{1,k},k}^m)$ at moment k as well as the Bayesian rule to obtain the updated marginal distribution and updated existence probability of each existing target at moment k, wherein, sub-steps for obtaining the updated marginal distribution and existence probability of each existing target at moment k include:

sub-step C, which uses the Bayesian rule to process measurement $y_{j,k}^m$ to obtain existence probability $$\rho_{i,k}^{a,j} = \frac{p_{D,k}\rho_{i,k|k-1}N(y_{j,k}^m; H_k m^i_{k|k-1}, H_k P^i_{k|k-1}H_k^T + R_k)}{\lambda_{c,k} + p_{D,k}\sum_{e=1}^{N_{k-1}}\rho_{e,k|k-1}N(y_{j,k}^m; H_k m^e_{k|k-1}, H_k P^e_{k|k-1}H_k^T + R_k)},$$

mean vector $m_{i,k}^{a,j}=m_{k|k-1}^i+A_i\cdot(y_{j,k}^m-H_k m_{k|k-1}^i)$ and covariance matrix $P_{i,k}^{a,j}=(I-A_i\cdot H_k)P_{k|k-1}^i$ of target i corresponding to the measurement $y_{j,k}^m$, where $A_i=P_{k|k-1}^i H_k^T [H_k P_{k|k-1}^i H_k^T + R_k]^{-1}$; after each measurement in the first category is processed, the updated marginal distribution and existence probability of each existing target corresponding to each measurement are $N(x_{i,k}; m_{i,k}^{a,j}, P_{i,k}^{a,j})$ and $\rho_{i,k}^{a,j}$, where $i=1,\ldots,N_{k-1}$, $j=1,\ldots,M_{1,k}$; and sub-step D, letting $$q = \arg\max_{j\in\{1,\cdots,M_{1,k}+1\}}\{\rho_{i,k}^{a,j}\}$$

where $\rho_{i,k}^{a,M_{1,k}+1}=\rho_{i,k|k-1}$, then the updated marginal distribution of existing target i at moment k being given by $N(x_{i,k}; m_{i,k}, P_{i,k})=N(x_{i,k}; m_{i,k}^{a,q}, P_{i,k}^{a,q})$ and the corresponding existence probability being given by $\rho_{i,k}=\rho_{i,k}^{a,q}$, where $i=1,\ldots,N_{k-1}$, $m_{i,k}^{a,M_{1,k}+1}=m_{i,k|k-1}$ and $P_{i,k}^{a,M_{1,k}+1}=P_{i,k|k-1}$ when $q=M_{1,k}+1$.

In step S4, the step of pruning and extracting is used to eliminate the target whose existence probability is less than a first threshold, and extract the marginal distribution of the target whose existence probability is greater than a second threshold as the output of the current moment according to the updated marginal distribution and updated existence probability of each existing target at the current moment.

In step S5, the generation step uses the second category of measurements at the current moment and the second category of measurements at the previous two moments to generate new targets, and estimate the state mean, covariance and marginal distribution of each new target at the current moment by using the least square method.

In this embodiment, the generation step S5 specifically includes: using the second category of measurements $y_k^c = (y_{1,k}^c, \ldots, y_{M_{2,k},k}^c)$ at moment k, the second category of measurements $y_{k-1}^c = (y_{1,k-1}^c, \ldots, y_{M_{2,k-1},k-1}^c)$ at moment k-1 and the second category of measurements $y_{k-2}^c = (y_{1,k-2}^c, \ldots, y_{M_{2,k-2},k-2}^c)$ at moment k-2 to generate new targets and estimate the state mean, covariance and marginal distribution of each new target at moment k by using the least square method.

Wherein, sub-steps for generating the new target and estimating the state mean, covariance matrix and marginal distribution of the new target at moment k include:

sub-step E, first picking measurement $y_{e,k-2}^c$ from set $y_{k-2}^c = (y_{1,k-2}^c, \ldots, y_{M_{2,k-2},k-2}^c)$, measurement $y_{f,k-1}^c$ from set $y_{k-1}^c = (y_{1,k-1}^c, \ldots, y_{M_{2,k-1},k-1}^c)$ and measurement $y_{g,k}^c$ from set $y_k^c = (y_{1,k}^c, \ldots, y_{M_{2,k},k}^c)$, respectively; then obtaining $v_{f,e}$, $v_{g,f}$, $a_{g,f,e}$ and $c_{g,f,e}$ as $$v_{f,e} = \frac{\|y_{f,k-1}^c - y_{e,k-2}^c\|_2}{\Delta t_{k-1}},$$

$$v_{g,f} = \frac{\|y_{g,k}^c - y_{f,k-1}^c\|_2}{\Delta t_k},$$

$$a_{g,f,e} = \frac{|v_{g,f} - v_{f,e}|}{\Delta t_k} \text{ and}$$

$$c_{g,f,e} = \frac{(y_{g,k}^c - y_{f,k-1}^c, y_{f,k-1}^c - y_{e,k-2}^c)}{\|y_{f,k-1}^c - y_{e,k-2}^c\|_2 \times \|y_{g,k}^c - y_{f,k-1}^c\|_2}$$

where $e=1, \ldots, M_{2,k-2}$, $f=1, \ldots, M_{2,k-1}$, $g=1, \ldots, M_{2,k}$, $\|\cdot\|_2$ represents the 2 norm of the vector, $|\cdot|$ represents the absolute value, $(\cdot, \cdot)$ represents the pot product of two vectors, sub-step F, which is used to judge whether the four requirements $v_{min} \leq v_{f,e} \leq v_{max}$, $v_{min} \leq v_{g,f} \leq v_{max}$, $a_{g,f,e} \leq a_{max}$ and $c_{g,f,e} \geq c_{min}$ are satisfied, where $v_{min}$, $v_{max}$, $a_{max}$ and $c_{min}$ are four given parameters, which denote the minimum speed, the maximum speed, the maximum acceleration and the minimum value of angle cosine, respectively; if the above four requirements are satisfied, then use measurements $y_{e,k-2}^c$, $y_{f,k-1}^c$ and $y_{g,k}^c$ as well as the least square method to obtain state mean $m_{\gamma,k}^i$, covariance $P_{\gamma,k}^i$ and marginal distribution $N(x_{i,k}; m_{\gamma,k}^i, P_{\gamma,k}^i)$ of the new target at moment k, where $m_{\gamma,k}^i = (C^T C)^{-1} C^T Y$, $P_{\gamma,k}^i = (C^T C)^{-1} C^T R C (C^T C)^{-1}$, $$C = \begin{bmatrix} 1 & -(\Delta t_{k-1} + \Delta t_k) & 0 & 0 \\ 0 & 0 & 1 & -(\Delta t_{k-1} + \Delta t_k) \\ 1 & -\Delta t_k & 0 & 0 \\ 0 & 0 & 1 & -\Delta t_k \\ 1 & 0 & 0 & 0 \\ 0 & 0 & 1 & 0 \end{bmatrix},$$

$$Y = \begin{bmatrix} y_{e,k-2}^c \\ y_{f,k-1}^c \\ y_{g,k}^c \end{bmatrix},$$

$$R = \begin{bmatrix} \sigma_w^2 & 0 & 0 & 0 & 0 & 0 \\ 0 & \sigma_w^2 & 0 & 0 & 0 & 0 \\ 0 & 0 & \sigma_w^2 & 0 & 0 & 0 \\ 0 & 0 & 0 & \sigma_w^2 & 0 & 0 \\ 0 & 0 & 0 & 0 & \sigma_w^2 & 0 \\ 0 & 0 & 0 & 0 & 0 & \sigma_w^2 \end{bmatrix},$$

$\sigma_w$ is the standard deviation of the measured noise; at the same time, the existence probability of the new target is given as $\rho_\gamma^i = 0.9$, the state estimation of the new target at moment k-1 is given as $m_{\gamma,k-1}^i = (C_1^T C_1)^{-1} C_1^T Y$, where $$C_1 = \begin{bmatrix} 1 & -\Delta t_{k-1} & 0 & 0 \\ 0 & 0 & 1 & -\Delta t_{k-1} \\ 1 & 0 & 0 & 0 \\ 0 & 0 & 1 & 0 \\ 1 & \Delta t_k & 0 & 0 \\ 0 & 0 & 1 & \Delta t_k \end{bmatrix},$$

and the state estimation of the new target at moment k-2 is given as $m_{\gamma,k-2}^i = (C_2^T C_2)^{-1} C_2^T Y$ where $$C_2 = \begin{bmatrix} 1 & 0 & 0 & 0 \\ 0 & 0 & 1 & 0 \\ 1 & \Delta t_k & 0 & 0 \\ 0 & 0 & 1 & \Delta t_k \\ 1 & \Delta t_{k-1} + \Delta t_k & 0 & 0 \\ 0 & 0 & 1 & \Delta t_{k-1} + \Delta t_k \end{bmatrix}.$$

In step S6, the supplement step is used to extract the marginal distribution of the new target at the current moment to supplement the output of the current moment, and extract the state estimations of the new target at the previous two moments to supplement the outputs of the previous two moments, respectively.

In step S7, the combining step is used to combine the marginal distribution and existence probability of the remaining targets after the pruning and extracting step with the marginal distribution and existence probability of the new targets in the generation step, respectively, to form the marginal distribution and existence probability of each target at the current moment, which is used as the input of the next recursion.

The multi-target tracking method applicable for a clutter environment provided by the present invention estimates the state of a new target at the initial three moments after the appearance of the new target by predicting, classifying, updating, pruning and extracting, generating, supplementing and combining steps and using the least square method, therefore effectively solves the problem of available method that the state estimations of a new target at the initial few moments after appearance of the new target cannot be provided. The method of the present invention has the characteristics of fast processing speed and a strong applicability, and the calculation amount being significantly smaller than the existing method.

Figure 2:
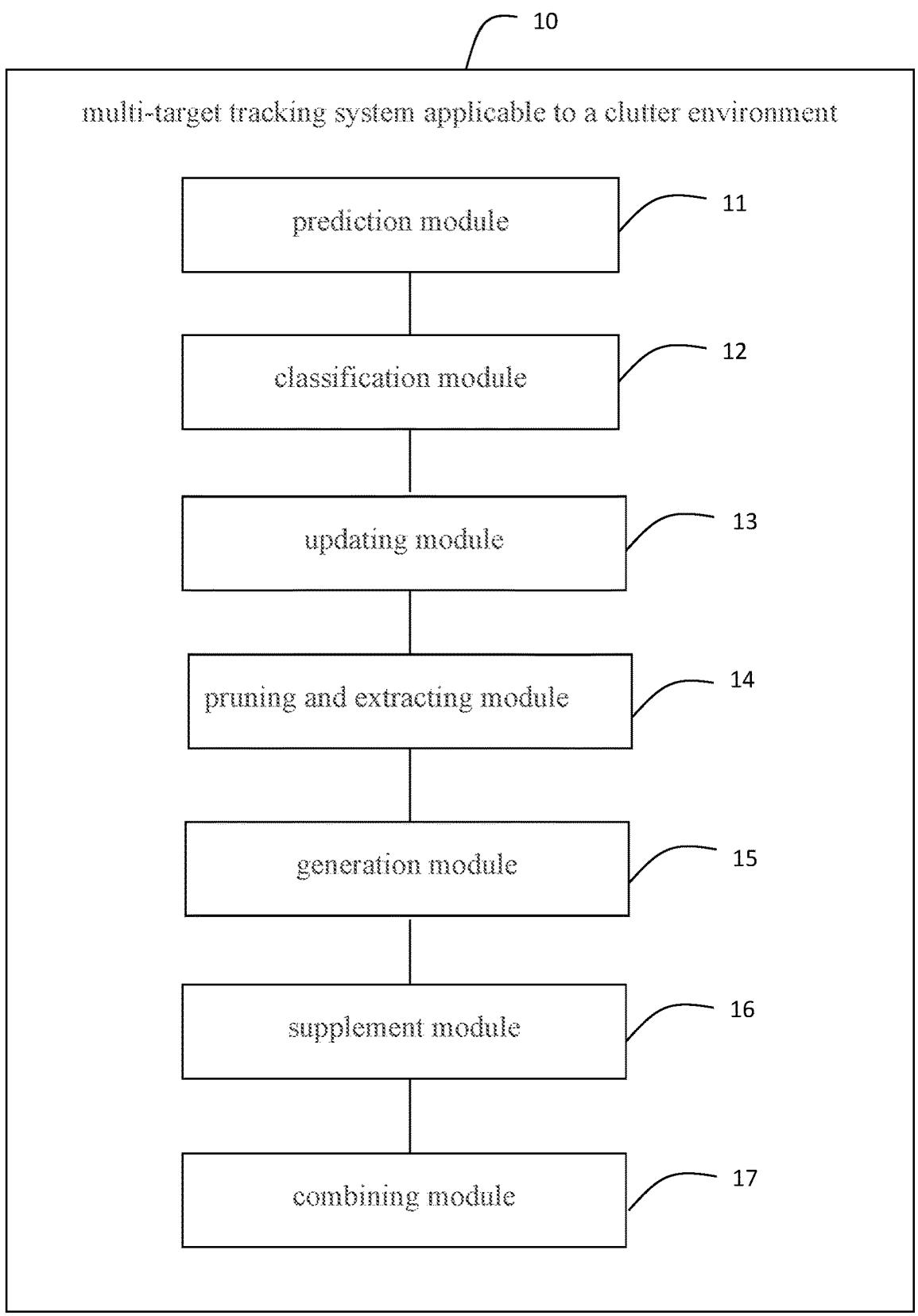
FIG. 2 is a schematic diagram showing the internal structure of a multi-target tracking system applicable to a clutter environment in an embodiment of the present invention.

Referring to FIG. 2, a schematic structural diagram of a multi-target tracking system 10 applicable to a clutter environment in an embodiment of the present invention is shown.

In the present embodiment, the multi-target tracking system 10 applicable to a clutter environment mainly includes prediction module 11, classification module 12, updating module 13, pruning and extracting module 14, generation module 15, supplement module 16, and combining module 17.

The prediction module 11 is configured to use marginal distribution and existence probability of each target at the previous moment, and time interval between the current moment and the previous moment to predict the marginal distribution and existence probability of each existing target at the current moment.

In this embodiment, the predicting module 11 is specifically configured to:

wherein k−1 represents the previous moment, k represents the current moment, $t_{k-1}$ represents the time of the previous moment, $t_k$ represents the time of the current moment, and the marginal distribution and existence probability of the target i at moment k−1 are represented as $N(x_{i,k-1}; m_{i,k-1}, P_{i,k-1})$ and $\rho_{i,k-1}$, respectively, wherein N represents a Gaussian distribution, i=1,2, ... $N_{k-1}$, $x_{i,k-1}$ is the state vector of the target i at moment k−1, $m_{i,k-1}$ and $P_{i,k-1}$ represent the state mean and covariance of the target i at moment k−1, respectively, and $N_k\_1$ is the total number of the targets at the previous moment;

based on the marginal distribution $N(x_{i,k-1}; m_{i,k-1}, P_{i,k-1})$ and the existence probability $\rho_{i,k|k-1}$ of target i at moment k−1, the predicted marginal distribution and existence probability of existing target i at moment k are given by $N(x_{i,k}; m_{i,k|k-1}, P_{i,k|k-1})$ and $\rho_{i,k|k-1}$, respectively, where $m_{i,k|k-1} = F_{i,k|k-1} m_{i,k-1}$, $P_{i,k|k-1} = Q_{i,k-1} + F_{i,k|k-1} P_{i,k-1} (F_{i,k|k-1})^T$, $\rho_{i,k|k-1} = p_{S,k}(\Delta t_k) \rho_{i,k-1}$, $F_{i,k|k-1}$ is the state transition matrix, superscript T denotes transpose of matrix or vector, $\Delta t_k = t_k - t_{k-1}$ is the time interval between moments k and k−1, $Q_{i,k-1}$ is the covariance matrix of process noise, $p_{S,k}(\Delta t_k)$ is the surviving probability of the target and $$p_{S,k}(\Delta t_k) = \exp\left(-\frac{\Delta t_k}{\delta \cdot T}\right),$$

T is the sampling period, δ is a given parameter and i=1,2, ... $N_{k-1}$.

The classification module 12 is configured to use the predicted marginal distribution and predicted existence probability of each existing target at the current moment to determine whether each measurement in the measurement set originates from the existing targets and split the measurements in the measurement set into two categories: the first category and the second category.

In this embodiment, the classification module 12 is specifically configured to: using predicted marginal distributions $N(x_{i,k}; m_{i,k|k-1}, P_{i,k|k-1})$ and predicted existence probabilities $\rho_{i,k|k-1}$ at moment k where i=1,2, ... $N_{k-1}$ to determine whether the $j^{th}$ measurement $y_{j,k}$ in measurement set $y_k = (y_{i,k}, \ldots, y_{M_k,k})$ at moment k originates from the existing targets and classify the $j^{th}$ measurement into either the first category or the second category.

The classification module 12 includes: a first sub-module and a second sub-module.

The first sub-module is used to obtain the probability $\rho_j^c$ as $$\rho_j^c = \frac{\lambda_{c,k}}{\lambda_{c,k} + p_{D,k} \sum_{e=1}^{N_{k-1}} \rho_{e,k|k-1} N(y_{j,k}; H_k m_{k|k-1}^e, H_k P_{k|k-1}^e H_k^T + R_k)},$$

where $H_k$ is the observation matrix, $R_k$ is the covariance matrix of observed noise, $p_{D,k}$ is the detection probability of the target, $\lambda_{c,k}$ is the clutter density.

The second sub-module is configured to use a rule to classify measurement $y_{j,k}$ into two categories, the used rule is that if $\rho_j^c \leq 0.5$ then classify measurement $y_{j,k}$ into the first category and if $\rho_j^c > 0.5$ then classify measurement $y_{j,k}$ into the second category; using the above rule to process each measurement in measurement set $y_k = (y_{1,k}, \ldots, y_{M_k,k})$, the measurements in the measurement set $y_k$ being divided into two categories, the measurements in the first category being the measurements from the existing targets, which are expressed as $y_k^m = (y_{1,k}^m, \ldots, y_{M_{1,k},k}^m)$, and the measurements in second category being other measurements, which are expressed as $y_k^c = (y_{1,k}^c, \ldots, y_{M_{2,k},k}^c)$, where $M_{1,k}$ and $M_{2,k}$ are the number of measurements in the first category and the number of measurements in the second category, respectively, and $M_{1,k} + M_{2,k} = M_k$.

The updating module 13 is configured to use the predicted marginal distribution and predicted existence probability of each existing target at the current moment and the first category of measurements as well as the Bayesian rule to obtain the updated marginal distribution and updated existence probability of each existing target at the current moment.

In this embodiment, the updating module 13 is specifically configured to use the predicted marginal distributions $N(x_{i,k}; m_{i,k|k-1}, P_{i,k|k-1})$ and predicted existence probabilities $\rho_{i,k|k-1}$ of the individual existing targets at moment k where i=1,2, ... $N_{k-1}$, and the first category of measurements $y_k^m = (y_{1,k}^m, \ldots, y_{M_{1,k},k}^m)$ at moment k as well as the Bayesian rule to obtain the updated marginal distribution and updated existence probability of each existing target at moment k.

The update module 13 includes: a third sub-module and a fourth sub-module.

The third sub-module is configured to use the Bayesian rule to process measurement $y_{j,k}^m$ to obtain existence probability $$\rho_{i,k}^{a,j} = \frac{p_{D,k} \rho_{i,k|k-1} N(y_{j,k}^m; H_k m_{k|k-1}^i, H_k P_{k|k-1}^i H_k^T + R_k)}{\lambda_{c,k} + p_{D,k} \sum_{e=1}^{N_{k-1}} \rho_{e,k|k-1} N(y_{j,k}^m; H_k m_{k|k-1}^e, H_k P_{k|k-1}^e H_k^T + R_k)},$$

mean vector $m_{i,k}^{a,j} = m_{k|k-1}^i + A_i \cdot (y_{j,k}^m - H_k m_{k|k-1}^i)$ and covariance matrix $P_{i,k}^{a,j} = (I - A_i \cdot H_k) P_{k|k-1}^i$ of target i corresponding to the measurement $y_{j,k}^m$, where $A_i = P_{k|k-1}^i H_k^T [H_k P_{k|k-1}^i H_k^T + R_k]^{-1}$; after each measurement in the first category is processed, the updated marginal distribution and existence probability of each existing target corresponding to each measurement are $N(x_{i,k}; m_{i,k}^{a,j}, P_{i,k}^{a,j})$ and $\rho_{i,k}^{1,j}$, where i=1, ..., $N_{k-1}$, j=1, ..., $M_{1,k}$.

The fourth sub-module is configured to: letting $$q = \arg \max_{j \in \{1, \ldots, M_{1,k}+1\}} \{\rho_{i,k}^{a,j}\}$$

where $\rho_{i,k}^{a,M_{1,k}+1}=\rho_{i,k|k-1}$, then the updated marginal distribution of existing target i at moment k being given by $N(x_{i,k}; m_{i,k}, P_{i,k})=N(x_{i,k}; m_{i,k}^{a,q}, P_{i,k}^{a,q})$ and the corresponding existence probability being given by $\rho_{i,k}=\rho_{i,k}^{a,q}$, where $i=1, \ldots, N_{k-1}$, $m_{i,k}^{a,M_{1,k}+1}=m_{i,k|k-1}$ and $P_{i,k}^{a,M_{1,k}+1}=P_{i,k|k-1}$ when $q=M_{1,k}+1$.

The pruning and extracting module 14 is used to eliminate the target whose existence probability is less than a first threshold, and extract the marginal distribution of the target whose existence probability is greater than a second threshold as the output of the current moment according to the updated marginal distribution and updated existence probability of each existing target at the current moment.

The generation module 15 is configured to use the second category of measurements at the current moment and the second category of measurements at the previous two moments to generate new targets, and estimate the state mean, covariance and marginal distribution of each new target at the current moment by using the least square method.

In this embodiment, the generation module 15 is specifically configured to use the second category of measurements $y_k^c=(y_{1,k}^c, \ldots, y_{M_{2,k},k}^c)$ at moment k, the second category of measurements $y_{k-1}^c=(y_{1,k-1}^c, \ldots, y_{M_{2,k-1},k-1}^c)$ at moment k−1 and the second category of measurements $y_{k-2}^c=(y_{1,k-2}^c, \ldots, y_{M_{2,k-2},k-2}^c)$ at moment k−2 to generate new targets and estimate the state mean, covariance and marginal distribution of each new target at moment k by using the least square method.

Wherein the generation module 15 includes a fifth sub-module and a sixth sub-module.

The fifth sub-module is configured to first pick measurement $y_{e,k-2}^c$ from set $y_{k-2}^c=(y_{1,k-2}^c, \ldots, y_{M_{2,k-2},k-2}^c)$, measurement $y_{f,k-1}^c$ from set $y_{k-1}^c=(y_{1,k-1}^c, \ldots, y_{M_{2,k-1},k-1}^c)$ and measurement $y_{g,k}^c$ from set $y_k^c=(y_{1,k}^c, \ldots, y_{M_{2,k},k}^c)$, respectively; then obtain $v_{f,e}$, $v_{g,f}$, $a_{g,f,e}$ and $c_{g,f,e}$ as $$v_{f,e} = \frac{\|y_{f,k-1}^c - y_{e,k-2}^c\|_2}{\Delta t_{k-1}},$$

$$v_{g,f} = \frac{\|y_{g,k}^c - y_{f,k-1}^c\|_2}{\Delta t_k},$$

$$a_{g,f,e} = \frac{|v_{g,f} - v_{f,e}|}{\Delta t_k} \text{ and}$$

$$c_{g,f,e} = \frac{(y_{g,k}^c - y_{f,k-1}^c, y_{f,k-1}^c - y_{e,k-2}^c)}{\|y_{f,k-1}^c - y_{e,k-2}^c\|_2 \times \|y_{g,k}^c - y_{f,k-1}^c\|_2}$$

where $e=1, \ldots, M_{2,k-2}$, $f=1, \ldots, M_{2,k-1}$, $g=1, \ldots, M_{2,k}$, $\|\cdot\|_2$ represents the 2 norm of the vector, $|\cdot|$ represents the absolute value, $(\bullet, \bullet)$ represents the pot product of two vectors.

The sixth sub-module is configured to judge whether the four requirements $v_{min} \leq v_{f,e} \leq v_{max}$, $v_{min} \leq v_{g,f} \leq v_{max}$, $a_{g,f,e} \leq a_{max}$ and $c_{g,f,e} \geq c_{min}$ are satisfied, where $v_{min}$, $v_{max}$, $a_{max}$ and $c_{min}$ are four given parameters, which denote the minimum speed, the maximum speed, the maximum acceleration and the minimum value of angle cosine, respectively; if the above four requirements are satisfied, then use measurements $y_{e,k-2}^c$, $y_{f,k-1}^c$ and $y_{g,k}^c$ as well as the least square method to obtain state mean $m_{\gamma,k}^i$, covariance $P_{\gamma,k}^i$ and marginal distribution $N(x_{i,k}; m_{\gamma,k}^i, P_{\gamma,k}^i)$ of the new target at moment k, where $m_{\gamma,k}^i=(C^T C)^{-1} C^T Y$, $P_{\gamma,k}^i=(C^T C)^{-1} C^T R C (C^T C)^{-1}$, $$C = \begin{bmatrix} 1 & -(\Delta t_{k-1}+\Delta t_k) & 0 & 0 \\ 0 & 0 & 1 & -(\Delta t_{k-1}+\Delta t_k) \\ 1 & -\Delta t_k & 0 & 0 \\ 0 & 0 & 1 & -\Delta t_k \\ 1 & 0 & 0 & 0 \\ 0 & 0 & 1 & 0 \end{bmatrix}, Y = \begin{bmatrix} y_{e,k-2}^c \\ y_{f,k-1}^c \\ y_{g,k}^c \end{bmatrix},$$

$$R = \begin{bmatrix} \sigma_w^2 & 0 & 0 & 0 & 0 & 0 \\ 0 & \sigma_w^2 & 0 & 0 & 0 & 0 \\ 0 & 0 & \sigma_w^2 & 0 & 0 & 0 \\ 0 & 0 & 0 & \sigma_w^2 & 0 & 0 \\ 0 & 0 & 0 & 0 & \sigma_w^2 & 0 \\ 0 & 0 & 0 & 0 & 0 & \sigma_w^2 \end{bmatrix},$$

$\sigma_w$ is the standard deviation of the measured noise; at the same time, the existence probability of the new target is given as $\rho_\gamma^i=0.9$, the state estimation of the new target at moment k−1 is given as $m_{\gamma,k-1}^i=(C_1^T C_1)^{-1} C_1^T Y$, where $$C_1 = \begin{bmatrix} 1 & -\Delta t_{k-1} & 0 & 0 \\ 0 & 0 & 1 & -\Delta t_{k-1} \\ 1 & 0 & 0 & 0 \\ 0 & 0 & 1 & 0 \\ 1 & \Delta t_k & 0 & 0 \\ 0 & 0 & 1 & \Delta t_k \end{bmatrix},$$

and the state estimation of the new target at moment k−2 is given as $m_{\gamma,k-2}^i=(C_2^T C_2)^{-1} C_2^T Y$, where $$C_2 = \begin{bmatrix} 1 & 0 & 0 & 0 \\ 0 & 0 & 1 & 0 \\ 1 & \Delta t_k & 0 & 0 \\ 0 & 0 & 1 & \Delta t_k \\ 1 & \Delta t_{k-1}+\Delta t_k & 0 & 0 \\ 0 & 0 & 1 & \Delta t_{k-1}+\Delta t_k \end{bmatrix}.$$

The supplementing module 16 is configured to extract the marginal distribution of the new target at the current moment to supplement the output of the current moment, and extract the state estimations of the new target at the previous two moments to supplement the outputs of the previous two moments, respectively.

The combining module is configured to combine the marginal distribution and existence probability of the remaining targets after the pruning and extracting step with the marginal distribution and existence probability of the new targets in the generation step, respectively, to form the marginal distribution and existence probability of each target at the current moment, which is used as the input of the next recursion.

The multi-target tracking system applicable to a clutter environment provided by the present invention uses the prediction module 11, the classification module 12, the updating module 13, the pruning and extracting module 14, the generation module 15, the supplement module 16 and the combining module 17, as well as the least square method to estimate the state of the new target at the initial three moments after appearance of the new target, therefore effectively solves the problem of available method that the state estimations of a new target at the initial few moments after appearance of the new target cannot be provided. The tracking system of the present invention has the characteristics of fast processing speed and a strong applicability, and the calculation amount being significantly smaller than the existing method.

The advantageous effects of the present invention will be described below by comparing the multi-target tracking system 10 applicable to a clutter environment of the present invention with an existing Gaussian mixture probability hypothesis density filter.

As an example of the present invention, considering a target moving in a two-dimensional space [−1000 m, 1000 m]×[−1000 m, 1000 m], the state of the target is composed of position and velocity, expressed as $x=[x\ \dot{x}\ y\ \dot{y}]^T$, where x and y represent position components, respectively, $\dot{x}$ and $\dot{y}$ represent velocity components, superscript T denotes the transpose of vector, and the covariance matrix of process noise is given as $$Q_{i,k-1} = \begin{bmatrix} \frac{\Delta t_k^4}{4} & \frac{\Delta t_k^3}{2} & 0 & 0 \\ \frac{\Delta t_k^3}{2} & \Delta t_k^2 & 0 & 0 \\ 0 & 0 & \frac{\Delta t_k^4}{4} & \frac{\Delta t_k^3}{2} \\ 0 & 0_k & \frac{\Delta t_k^3}{2} & \Delta t_k^2 \end{bmatrix} \sigma_v^2,$$

where $\Delta t_k = t_k - t_{k-1}$ is the time interval between the current moment and the previous moment, $\sigma_v$ is the standard deviation of the process noise; the variance matrix of the measured noise is given as $$R_k = \begin{bmatrix} 1 & 0 \\ 0 & 1 \end{bmatrix} \sigma_w^2,$$

$\sigma_w$ is the standard deviation of the measured noise, parameter $\delta$ is given as $\delta=2.5$, the minimum velocity $v_{min}$, the maximum velocity $v_{max}$, the maximum acceleration $a_{max}$ and the minimum value of angle cosine $c_{min}$ are respectively given by $v_{min}=30\ \text{ms}^{-1}$、$v_{max}=80\ \text{ms}^{-1}$、$a_{max}=10\ \text{ms}^{-2}$ and $c_{min}=0.94$.

Figure 3:
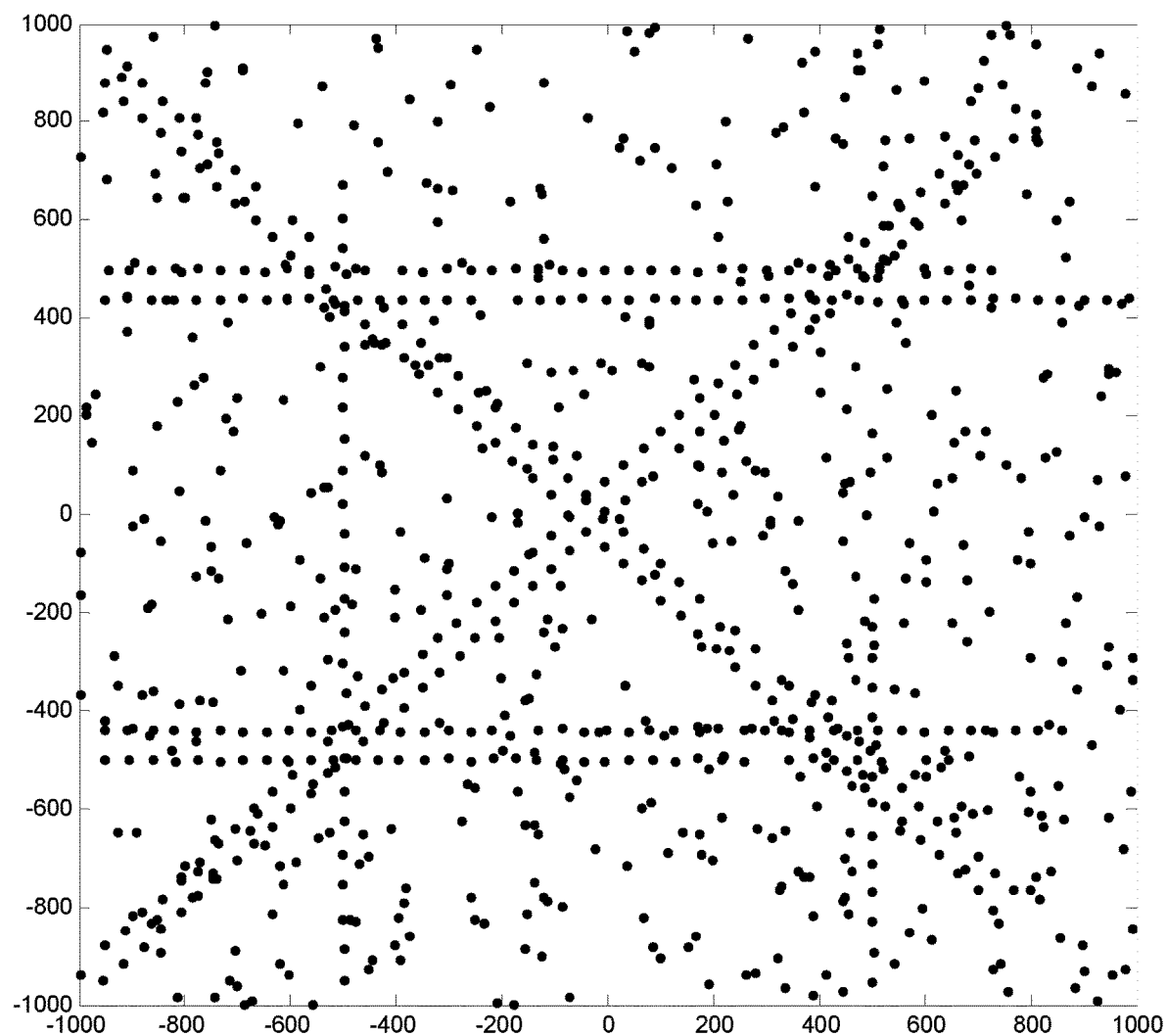
FIG. 3 is a measurement data diagram of a sensor for 50 scanning periods in an embodiment of the present invention.

In order to generate simulation data, the surviving probability is given as $p_{S,k}=1.0$, detection probability is given as $p_{D,k}=0.95$, clutter density is given as $\lambda_{c,k}=2.5\times10^{-6}\ \text{m}^{-2}$, standard deviation of the process noise is given as $\sigma_v=1\ \text{ms}^{-2}$, the standard deviation of the measured noise is given as $\sigma_w=2$ m and the scanning period of the sensor is given as T=1 s. The simulated measured data of the sensor for 50 scanning periods in one experiment is shown in FIG. 3.

In order to process the simulation data, the correlative parameters of the present invention and the Gaussian mixture probability hypothesis density filter are set as $p_{S,k}=1.0$、$p_{D,k}=0.95$、$\lambda_{c,k}=2.5\times10^{-6}\ \text{m}^{-2}$、$\sigma_w=2$ m、$\sigma=1\ \text{ms}_{-2}$, the first threshold is $10^{-3}$, the second threshold is 0.5, and the weight of the new target of the Gaussian mixture probability hypothesis density filter is given as $w_\gamma=0.1$, and the covariance of the new target is given as $P_\gamma^j=(\text{diag}([50\ 25\ 50\ 25]))^2$. FIG. 4 is the OSPA distance obtained by using the existing Gaussian mixture probability hypothesis density filter and the present invention to process the data of FIG. 3.

FIG. 5 is the average OSPA distance obtained by performing the existing Gaussian mixture probability hypothesis density filter and the present invention for 50 Monte Carlo experiments, respectively.

The comparison of the experimental results of the existing Gaussian mixture probability hypothesis density filter and the present invention shows that the method of the present invention can obtain a more accurate and reliable target state estimation, and its OSPA distance is smaller than the OSPA distance obtained by the available method, especially during the initial moments (from t=1 s to t=16 s) when multiple targets appear, its OSPA distance is reduced more obviously.

|  | The Present Invention | The Existing Gaussian Mixture Probability Hypothesis Density Filter |
| --- | --- | --- |
| Average Execution Time | 0.1309 s | 0.8731 s |

Table 1 shows the average execution times of the existing Gaussian mixture probability hypothesis density filter and the present invention for 50 experiments, and the results show that the present invention requires significantly smaller average execution time than the existing Gaussian mixture probability hypothesis density filter.

The technical scheme provided by the present invention may obtain the state estimations of a new target at the initial three moments after the appearance of the new target by predicting, classifying, updating, pruning and extracting, generating, supplementing and combining steps and using the least square method, therefore effectively solves the problem of available method that the state estimations of a new target at the initial few moments after appearance of the new target cannot be provided. The method of the present invention has the characteristics of fast processing speed and a strong applicability, and the calculation amount being significantly smaller than the existing method.

It should be noted that, in the foregoing embodiments, each unit/module included is only divided according to functional logic, but is not limited to the above division, as long as the corresponding function can be implemented. In addition, the specific name of each functional unit is only used to facilitate mutual differentiation and is not intended to limit the scope of the invention.

In addition, those skilled in the art can understand that all or part of the steps of implementing the above embodiments may be completed by a program to instruct related hardware, and the corresponding program may be stored in a computer readable storage medium, such as ROM/RAM, disk or CD etc.

The described above are only the preferred embodiments of the present invention, and is not intended to limit the present invention. Any modifications, equivalent substitutions and improvements made within the spirit and principles of the present invention should be included in the protection of the present invention.

What is claimed is:

1. A multi-target tracking system applicable to a clutter environment, comprising:
    a prediction module, configured to use marginal distribution and existence probability of targets at a previous moment, and time interval between a current moment and the previous moment to predict marginal distribution and existence probability of existing targets at the current moment;

wherein k−1 represents the previous moment, k represents the current moment, $t_{k-1}$ represents the time of the previous moment, $t_k$ represents the time of the current moment, and marginal distribution and existence probability of a target i at moment k−1 are represented as $N(x_{i,k-1}; m_{i,k-1}, P_{i,k-1})$ and $\rho_{i,k-1}$, respectively, wherein N represents a Gaussian distribution, i=1,2, ... $N_{k-1}$, $x_{i,k-1}$ is the state vector of the target i at moment k−1, $m_{i,k-1}$ and $P_{i,k-1}$ represent the state mean and covariance of the target i at moment k−1, respectively, and $N_{k-1}$ is the total number of the targets at the previous moment;

based on the marginal distribution $N(x_{i,k-1}; m_{i,k-1}, P_{i,k-1})$ and the existence probability $\rho_{i,k|k-1}$ of target i at moment k−1, predicted marginal distribution and existence probability of an existing target i at moment k are given by $N(x_{i,k}; m_{i,k|k-1}, P_{i,k|k-1})$ and $\rho_{i,k|k-1}$, respectively, where $m_{i,k|k-1} = F_{i,k|k-1} m_{i,k-1}$, $P_{i,k|k-1} = Q_{i,k-1} + F_{i,k|k-1} P_{i,k-1} (F_{i,k|k-1})^T$, $\rho_{i,k|k-1} = p_{S,k}(\Delta t_k) \rho_{i,k-1}$, $F_{i,k|k-1}$ is the state transition matrix, superscript T denotes transpose of matrix or vector, $\Delta t_k = t_k - t_{k-1}$ is the time interval between moments k and k−1, $Q_{i,k-1}$ is the covariance matrix of process noise, $p_{S,k}(\Delta t_k)$ is the surviving probability of the target and $$p_{S,k}(\Delta t_k) = \exp\left(-\frac{\Delta t_k}{\delta \cdot T}\right),$$

T is the sampling period, δ is a given parameter and i=1, 2, ... $N_{k-1}$;

a classification module, which uses the predicted marginal distribution and predicted existence probability of each existing target at the current moment to determine whether each measurement in the measurement set originates from the existing targets and split the measurements in the measurement set into two categories: a first category and a second category;

an updating module, which uses the predicted marginal distribution and predicted existence probability of each existing target at the current moment and the first category of measurements as well as the Bayesian rule to obtain the updated marginal distribution and updated existence probability of each existing target at the current moment;

a pruning and extracting module, configured to eliminate the target whose existence probability is less than a first threshold, and extract the marginal distribution of the target whose existence probability is greater than a second threshold as the output of the current moment according to the updated marginal distribution and updated existence probability of each existing target at the current moment;

a generation module, which uses the second category of measurements at the current moment and the second category of measurements at the previous two moments to generate new targets, and estimate the state mean, covariance and marginal distribution of each new target at the current moment by using the least square method;

a supplement module, configured to extract the marginal distribution of the new target at the current moment to supplement the output of the current moment, and extract the state estimations of the new target at the previous two moments to supplement the outputs of the previous two moments, respectively; and a combining module, configured to combine the marginal distribution and existence probability of remaining targets from the pruning and extracting module with the marginal distribution and the existence probability of the new targets generated by the generation module, respectively, to form the marginal distribution and existence probability of each target at the current moment, which is used as the input of the next recursion.

2. The multi-target tracking system applicable to a clutter environment of claim 1, wherein the classification module is specifically configured to: use the predicted marginal distributions $N(x_{i,k}; m_{i,k|k-1}, P_{i,k|k-1})$ and predicted existence probabilities $\rho_{i,k|k-1}$ at moment k where i=1,2, ... $N_{k-1}$ to determine whether a $j^{th}$ measurement $y_{j,k}$ in the measurement set $y_k = (y_{1,k}, ..., y_{M_k,k})$ at moment k originates from the existing targets and classify the $j^{th}$ measurement into either the first category or the second category;

wherein the classification module includes:
a first sub-module, configured to obtain the probability $\rho_j^c$ as $$\rho_j^c = \frac{\lambda_{c,k}}{\lambda_{c,k} + p_{D,k} \sum_{e=1}^{N_{k-1}} \rho_{e,k|k-1} N(y_{j,k}; H_k m_{k|k-1}^e, H_k P_{k|k-1}^e H_k^T + R_k)},$$

where $H_k$ is the observation matrix, $R_k$ is the covariance matrix of observed noise, $p_{D,k}$ is the detection probability of the target, $\lambda_{c,k}$ is the clutter density; and a second sub-module, configured to use a rule to classify measurement $y_{j,k}$ into the two categories, the used rule is that if $\rho_j^c \leq 0.5$ then classify measurement $y_{j,k}$ into the first category and if $\rho_j^c > 0.5$ then classify measurement $y_{j,k}$ into the second category, using the rule to process each measurement in the measurement set $y_k = (y_{1,k}, ..., y_{M_k,k})$, the measurements in the measurement set $y_k$ being divided into the two categories, the measurements in the first category being the measurements from the existing targets, which are expressed as $y_k^m = (y_{1,k}^m, ..., y_{M_{1,k},k}^m)$, and the measurements in the second category being other measurements, which are expressed as $y_k^c = (y_{1,k}^c, ..., y_{M_{2,k},k}^c)$, where $M_{1,k}$ and $M_{2,k}$ are the number of measurements in the first category and the number of measurements in the second category, respectively, and $M_{1,k} + M_{2,k} = M_k$.

3. The multi-target tracking system applicable to a clutter environment of claim 2, wherein the updating module is specifically configured to use the predicted marginal distributions $N(x_{i,k}; m_{i,k|k-1}, P_{i,k|k-1})$ and predicted existence probabilities $\rho_{i,k|k-1}$ of the individual existing targets at moment k where i=1,2, ... $N_{k-1}$, and the first category of measurements $y_k^m = (y_{1,k}^m, ..., y_{M_{1,k},k}^m)$ at moment k as well as the Bayesian rule to obtain the updated marginal distribution and updated existence probability of each existing target at moment k, wherein the update module comprises:
a third sub-module, which uses the Bayesian rule to process measurement $y_{j,k}^m$ to obtain existence probability $$\rho_{i,k}^{a,j} = \frac{p_{D,k} \rho_{i,k|k-1} N(y_{j,k}^m; H_k m_{k|k-1}^i, H_k P_{k|k-1}^i H_k^T + R_k)}{\lambda_{c,k} + p_{D,k} \sum_{e=1}^{N_{k-1}} \rho_{e,k|k-1} N(y_{j,k}^m; H_k m_{k|k-1}^e, H_k P_{k|k-1}^e H_k^T + R_k)},$$

mean vector $m_{i,k}^{a,j}=m_{k|k-1}^i+A_i\cdot(y_{j,k}^m-H_k m_{k|k-1}^i)$ and covariance matrix $P_{i,k}^{a,j}=(I-A_i\cdot H_k)P_{k|k-1}^i$ of target i corresponding to the measurement $y_{j,k}^m$, where $A_i=P_{k|k-1}^i H_k^T[H_k P_{k|k-1}^i H_k^T+R_k]^{-1}$; after each measurement in the first category is processed, the updated marginal distribution and existence probability of each existing target corresponding to each measurement are $N(x_{i,k};m_{i,k}^{a,j},P_{i,k}^{a,j})$ and $\rho_{i,k}^{a,j}$, where i=1, ... ,$N_{k-1}$, j=1, ... ,$M_{1,k}$; and a fourth sub-module, configured to: letting $$q = \arg\max_{j\in\{1,\cdots,M_{1,k}+1\}}\{\rho_{i,k}^{a,j}\}$$

where $\rho_{i,k}^{a,M_{1,k}+1}=\rho_{i,k|k-1}$, then the updated marginal distribution of existing target i at moment k being given by $N(x_{i,k};m_{i,k},P_{i,k})=N(x_{i,k};m_{i,k}^{a,q},P_{i,k}^{a,q})$ and the corresponding existence probability being given by $\rho_{i,k}=\rho_{i,k}^{a,q}$, where i=1, ... ,$N_{k-1}$, $m_{i,k}^{a,M_{1,k}+1}=m_{i,k|k-1}$ and $P_{i,k}^{a,M_{1,k}+1}=P_{i,k|k-1}$ when q=$M_{1,k}$+1.

4. The multi-target tracking system applicable to a clutter environment of claim 3, wherein the generation module is specifically configured to use the second category of measurements $y_k^c=(y_{1,k}^c,\ldots,y_{M_{2,k},k}^c)$ at moment k, the second category of measurements $y_{k-1}^c=(y_{1,k-1}^c,\ldots,y_{M_{2,k-1},k-1}^c)$ at moment k−1 and the second category of measurements $y_{k-2}^c=(y_{1,k-2}^c,\ldots,y_{M_{2,k-2},k-2}^c)$ at moment k−2 to generate new targets and estimate the state mean, covariance and marginal distribution of each new target at moment k by using the least square method;

wherein, the generation module includes:

a fifth sub-module, configured to first pick measurement $y_{e,k-2}^c$ from set $y_{k-2}^c=(y_{1,k-2}^c,\ldots,y_{M_{2,k-2},k-2}^c)$, measurement $y_{f,k-1}^c$ from set $y_{k-1}^c=(y_{1,k-1}^c,\ldots,y_{M_{2,k-1},k-1}^c)$ and measurement $y_{g,k}^c$ from set $y_k^c=(y_{1,k}^c,\ldots,y_{M_{2,k},k}^c)$, respectively; then obtain $v_{f,e}$, $v_{g,f}$, $a_{g,f,e}$ and $c_{g,f,e}$ as $$v_{f,e}=\frac{\|y_{f,k-1}^c-y_{e,k-2}^c\|_2}{\Delta t_{k-1}},\quad v_{g,f}=\frac{\|y_{g,k}^c-y_{f,k-1}^c\|_2}{\Delta t_k},$$

$$a_{g,f,e}=\frac{|v_{g,f}-v_{f,e}|}{\Delta t_k}\text{ and }c_{g,f,e}=\frac{(y_{g,k}^c-y_{f,k-1}^c,y_{f,k-1}^c-y_{e,k-2}^c)}{\|y_{f,k-1}^c-y_{e,k-2}^c\|_2\times\|y_{g,k}^c-y_{f,k-1}^c\|_2},$$

where e=1, ... ,$M_{2,k-2}$, f=1, ... ,$M_{2,k-1}$, g=1, ... ,$M_{2,k}$, $\|\cdot\|_2$ represents the 2 norm of the vector, $|\cdot|$ represents the absolute value , $(\cdot,\cdot)$ represents the pot product of two vectors; and a sixth sub-module, configured to judge whether four requirements $v_{min}\le v_{f,e}\le v_{max}$, $v_{min}\le v_{g,f}\le v_{max}$, $a_{g,f,e}\le a_{max}$ and $c_{g,f,e}\ge c_{min}$ are satisfied, where $v_{min}$, $v_{max}$, $a_{max}$ and $c_{min}$ are four given parameters, which denote the minimum speed, the maximum speed, the maximum acceleration and the minimum value of angle cosine, respectively; if the above four requirements are satisfied, then use measurements $y_{e,k-2}^c$, $y_{f,k-1}^c$ and $y_{g,k}^c$ as well as the least square method to obtain state mean $m_{y,k}^i$, covariance $P_{y,k}^i$ and marginal distribution $N(x_{i,k};m_{y,k}^i,P_{y,k}^i)$ of the new target at moment k, where $m_{y,k}^i=(C^TC)^{-1}C^TY$, $P_{i,k}^i=(C^TC)^{-1}C^TRC(C^TC)^{-1}$, $$C=\begin{bmatrix}1 & -(\Delta t_{k-1}+\Delta t_k) & 0 & 0\\0 & 0 & 1 & -(\Delta t_{k-1}+\Delta t_k)\\1 & -\Delta t_k & 0 & 0\\0 & 0 & 1 & -\Delta t_k\\1 & 0 & 0 & 0\\0 & 0 & 1 & 0\end{bmatrix},\quad Y=\begin{bmatrix}y_{e,k-2}^c\\y_{f,k-1}^c\\y_{g,k}^c\end{bmatrix},$$

$$R=\begin{bmatrix}\sigma_w^2 & 0 & 0 & 0 & 0 & 0\\0 & \sigma_w^2 & 0 & 0 & 0 & 0\\0 & 0 & \sigma_w^2 & 0 & 0 & 0\\0 & 0 & 0 & \sigma_w^2 & 0 & 0\\0 & 0 & 0 & 0 & \sigma_w^2 & 0\\0 & 0 & 0 & 0 & 0 & \sigma_w^2\end{bmatrix},$$

$\sigma_w$ is the standard deviation of the measured noise; at the same time, the existence probability of the new target is given as $\rho_\gamma^i=0.9$, the state estimation of the new target at moment k−1 is given as $m_{y,k-1}^i=(C_1^TC_1)^{-1}C_1^TY$, where $$C_1=\begin{bmatrix}1 & -\Delta t_{k-1} & 0 & 0\\0 & 0 & 1 & -\Delta t_{k-1}\\1 & 0 & 0 & 0\\0 & 0 & 1 & 0\\1 & \Delta t_k & 0 & 0\\0 & 0 & 1 & \Delta t_k\end{bmatrix},$$

and the state estimation of the new target at moment k−2 is given as $m_{y,k-2}^i=(C_2^TC_2)^{-1}C_2^TY$ where $$C_2=\begin{bmatrix}1 & 0 & 0 & 0\\0 & 0 & 1 & 0\\1 & \Delta t_k & 0 & 0\\0 & 0 & 1 & \Delta t_k\\1 & \Delta t_{k-1}+\Delta t_k & 0 & 0\\0 & 0 & 1 & \Delta t_{k-1}+\Delta t_k\end{bmatrix}.$$

5. A multi-target tracking system applicable to a clutter environment, comprising a storage medium storing program modules and a processor configured to execute the program modules, the program modules comprising:

a prediction module, configured to use marginal distribution and existence probability of targets at a previous moment, and time interval between a current moment and the previous moment to predict marginal distribution and existence probability of existing targets at the current moment;

a classification module, which uses predicted marginal distribution and predicted existence probability of each existing target at the current moment to determine whether each measurement in the measurement set originates from the existing targets and split the measurements in the measurement set into two categories: a first category and a second category;

an updating module, configured to use the predicted marginal distribution and predicted existence probability of each existing target at the current moment and the first category of measurements as well as the Bayesian rule to obtain the updated marginal distribution and updated existence probability of each existing target at the current moment;

a pruning and extracting module, configured to eliminate the target whose existence probability is less than a first threshold, and extract the marginal distribution of the target whose existence probability is greater than a second threshold as the output of the current moment according to the updated marginal distribution and updated existence probability of each existing target at the current moment;

a generation module, configured to use the second category of measurements at the current moment and the second category of measurements at the previous two moments to generate new targets, and estimate the state mean, covariance and marginal distribution of each new target at the current moment by using the least square method;

a supplement module, configured to extract the marginal distribution of the new target at the current moment to supplement the output of the current moment, and extract the state estimations of the new target at the previous two moments to supplement the outputs of the previous two moments, respectively; and a combining module, configured to combine the marginal distribution and existence probability of remaining targets from the pruning and extracting module with the marginal distribution and the existence probability of the new targets generated by the generation module, respectively, to form the marginal distribution and existence probability of each target at the current moment, which is used as the input of the next recursion.

6. The multi-target tracking system applicable to a clutter environment of claim 5, wherein k−1 represents the previous moment, k represents the current moment, $t_{k-1}$ represents the time of the previous moment, $t_k$ represents the time of the current moment, and marginal distribution and existence probability of a target i at moment k−1 are represented as $N(x_{i,k-1}; m_{i,k-1}, P_{i,k-1})$ and $\rho_{i,k-1}$, respectively, wherein N represents a Gaussian distribution, i=1,2, ... $N_{k-1}$, $x_{i,k-1}$ is the state vector of the target i at moment k−1, $m_{i,k-1}$ and $P_{i,k-1}$ represent the state mean and covariance of the target i at moment k−1, respectively, and $N_{k-1}$ is the total number of the targets at the previous moment;

based on the marginal distribution $N(x_{i,k-1}; m_{i,k-1}, P_{i,k-1})$ and the existence probability $\rho_{i,k-1}$ of target i at moment k−1, predicted marginal distribution and existence probability of an existing target i at moment k are given by $N(x_{i,k}; m_{i,k|k-1}, P_{i,k|k-1})$ and $\rho_{i,k|k-1}$, respectively, where $m_{i,k|k-1} = F_{i,k|k-1} m_{i,k-1}$, $P_{i,k|k-1} = Q_{i,k-1} + F_{i,k|k-1} P_{i,k-1} (F_{i,k|k-1})^T$, $\rho_{i,k|k-1} = p_{S,k}(\Delta t_k) \rho_{i,k-1}$, $F_{i,k|k-1}$ is the state transition matrix, superscript T denotes transpose of matrix or vector, $\Delta t_k = t_k - t_{k-1}$ is the time interval between moments k and k−1, $Q_{i,k-1}$ is the covariance matrix of process noise, $p_{S,k}(\Delta t_k)$ is the surviving probability of the target and $$p_{S,k}(\Delta t_k) = \exp\left(-\frac{\Delta t_k}{\delta \cdot T}\right),$$

T is the sampling period, δ is a given parameter and i=1,2, ... $N_{k-1}$.

7. The multi-target tracking system applicable to a clutter environment of claim 6, wherein the classification module is specifically configured to use the predicted marginal distributions $N(x_{i,k}; m_{i,k|k-1}, P_{i,k|k-1})$ and predicted existence probabilities $\rho_{i,k|k-1}$ at moment k where i=1, 2, ... $N_{k-1}$ to determine whether a $j^{th}$ measurement $y_{j,k}$ in the measurement set $y_k = (y_{1,k}, \ldots, y_{M_k,k})$ at moment k originates from the existing targets and classify the $j^{th}$ measurement into either the first category or the second category;

wherein the classification module includes:

a first sub-module, configured to obtain the probability $\rho_j^c$ as $$\rho_j^c = \frac{\lambda_{c,k}}{\lambda_{c,k} + p_{D,k} \sum_{e=1}^{N_{k-1}} \rho_{e,k|k-1} N(y_{j,k}; H_k m_{k|k-1}^e, H_k P_{k|k-1}^e H_k^T + R_k)},$$

where $H_k$ is the observation matrix, $R_k$ is the covariance matrix of observed noise, $p_{D,k}$ is the detection probability of the target, $\lambda_{c,k}$ is the clutter density; and a second sub-module, configured to use a rule to classify measurement $y_{j,k}$ into the two categories, the used rule is that if $\rho_j^c \leq 0.5$ then classify measurement $y_{j,k}$ into the first category and if $\rho_j^c > 0.5$ then classify measurement $y_{j,k}$ into the second category, using the rule to process each measurement in the measurement set $y_k = (y_{1,k}, \ldots, y_{M_k,k})$ the measurements in the measurement set $y_k$ being divided into two categories, the measurements in the first category being the measurements from the existing targets, which are expressed as $y_k^m = (y_{1,k}^m, \ldots, y_{M_{1,k},k}^m)$, and the measurements in the second category being other measurements, which are expressed as $y_k^c = (y_{1,k}^c, \ldots, y_{M_{2,k},k}^c)$ where $M_{1,k}$ and $M_{2,k}$ are the number of measurements in the first category and the number of measurements in the second category, respectively, and $M_{1,k} + M_{2,k} = M_k$.

8. The multi-target tracking system applicable to a clutter environment of claim 7, wherein the updating module is specifically configured to use the predicted marginal distributions $N(x_{i,k}; m_{i,k|k-1}, P_{i,k|k-1})$ and predicted existence probabilities $\rho_{i,k|k-1}$ of the individual existing targets at moment k where i=1, 2, ... $N_{k-1}$, and the first category of measurements $y_k^m = (y_{1,k}^m, \ldots, y_{M_{1,k},k}^m)$ at moment k as well as the Bayesian rule to obtain the updated marginal distribution and updated existence probability of each existing target at moment k;

wherein the update module comprises:

a third sub-module, which uses the Bayesian rule to process measurement $y_{j,k}^m$ to obtain existence probability $$\rho_{i,k}^{a,j} = \frac{p_{D,k} \rho_{i,k|k-1} N(y_{j,k}^m; H_k m_{k|k-1}^i, H_k P_{k|k-1}^i H_k^T + R_k)}{\lambda_{c,k} + p_{D,k} \sum_{e=1}^{N_{k-1}} \rho_{e,k|k-1} N(y_{j,k}^m; H_k m_{k|k-1}^e, H_k P_{k|k-1}^e H_k^T + R_k)},$$

mean vector $m_{i,k}^{a,j} = m_{k|k-1}^i + A_i \cdot (y_{j,k}^m - H_k m_{k|k-1}^i)$ and covariance matrix $P_{i,k}^{a,j} = (I - A_i \cdot H_k) P_{k|k-1}^i$ of target i corresponding to the measurement $y_{j,k}^m$, where $A_i = P_{k|k-1}^i H_k^T [H_k P_{k|k-1}^i H_k^T + R_k]^{-1}$; after each measurement in the first category is processed, the updated marginal distribution and existence probability of each existing target corresponding to each measurement are $N(x_{i,k}; m_{i,k}^{a,j}, P_{i,k}^{a,j})$ and $\rho_{i,k}^{a,j}$, where i=1, ..., $N_{k-1}$, j=1, ..., $M_{1,k}$; and a fourth sub-module, configured to: letting $$q = \arg\max_{j \in \{1,\cdots,M_{1,k}+1\}} \{\rho_{i,k}^{a,j}\}$$

where $\rho_{i,k}^{a,M_{1,k}+1} = \rho_{i,k|k-1}$, then the updated marginal distribution of existing target i at moment k being given by $N(x_{i,k}; m_{i,k}, P_{i,k}) = N(x_{i,k}; m_{i,k}^{a,q}, P_{i,k}^{a,q})$ and the corresponding existence probability being given by $\rho_{i,k} = \rho_{i,k}^{a,q}$, where $i=1, \ldots, N_{k-1}$, $m_{i,k}^{a,M_{1,k}+1} = m_{i,k|k-1}$ and $P_{i,k}^{a,M_{1,k}+1} = P_{i,k|k-1}$ when $q = M_{1,k}+1$.

9. The multi-target tracking system applicable to a clutter environment of claim 8, wherein the generation module is specifically configured to use the second category of measurements $y_k^c = (y_{1,k}^c, \ldots, y_{M_{2,k},k}^c)$ at moment k, the second category of measurements $y_{k-1}^c = (y_{1,k-1}^c, \ldots, y_{M_{2,k-1},k-1}^c)$ at moment k−1 and the second category of measurements $y_{k-2}^c = (y_{1,k-2}^c, \ldots, y_{M_{2,k-2},k-2}^c)$ at moment k−2 to generate new targets and estimate the state mean, covariance and marginal distribution of each new target at moment k by using the least square method;

wherein, the generation module includes:

a fifth sub-module, configured to first pick measurement $y_{e,k-2}^c$ from set $y_{k-2}^c = (y_{1,k-2}^c, \ldots, y_{M_{2,k-2},k-2}^c)$ measurement $y_{f,k-1}^c$ from set $y_{k-1}^c = (y_{1,k-1}^c, \ldots, y_{M_{2,k-1},k-1}^c)$ and measurement $y_{g,k}^c$ from set $y_k^c = (y_{1,k}^c, \ldots, y_{M_{2,k},k}^c)$, respectively; then obtain $v_{f,e}$, $v_{g,f}$, $a_{g,f,e}$ and $c_{g,f,e}$ as $$v_{f,e} = \frac{\|y_{f,k-1}^c - y_{e,k-2}^c\|_2}{\Delta t_{k-1}},$$

$$v_{g,f} = \frac{\|y_{g,k}^c - y_{f,k-1}^c\|_2}{\Delta t_k},$$

$$a_{g,f,e} = \frac{|v_{g,f} - v_{f,e}|}{\Delta t_k} \text{ and}$$

$$c_{g,f,e} = \frac{(y_{g,k}^c - y_{f,k-1}^c, y_{f,k-1}^c - y_{e,k-2}^c)}{\|y_{f,k-1}^c - y_{e,k-2}^c\|_2 \times \|y_{g,k}^c - y_{f,k-1}^c\|_2},$$

where $e=1, \ldots, M_{2,k-2}$, $f=1, \ldots, M_{2,k-1}$, $g=1, \ldots, M^{2,k}$, $\|\cdot\|_2$ represents the 2 norm of the vector, $|\cdot|$ represents the absolute value, $(\cdot, \cdot)$ represents the pot product of two vectors; and a sixth sub-module, configured to judge whether four requirements $v_{min} \leq v_{f,e} \leq v_{max}$, $v_{min} \leq v_{g,f} \leq v_{max}$, $a_{g,f,e} \leq a_{max}$ and $c_{g,f,e} \geq c_{min}$ are satisfied, where $v_{min}$, $v_{max}$, $a_{max}$ and $c_{min}$ are four given parameters, which denote the minimum speed, the maximum speed, the maximum acceleration and the minimum value of angle cosine, respectively; if the above four requirements are satisfied, then use measurements $y_{e,k-2}^c$, $y_{f,k-1}^c$ and $y_{g,k}^c$ as well as the least square method to obtain state mean $m_{\gamma,k}^i$, covariance $P_{\gamma,k}^i$ and marginal distribution $N(x_{i,k}; m_{\gamma,k}^i, P_{\gamma,k}^i)$, of the new target at moment k, where $m_{\gamma,k}^i = (C^T C)^{-1} C^T Y$, $P_{\gamma,k}^i = (C^T C)^{-1} C^T R C (C^T C)^{-1}$, $$C = \begin{bmatrix} 1 & -(\Delta t_{k-1} + \Delta t_k) & 0 & 0 \\ 0 & 0 & 1 & -(\Delta t_{k-1} + \Delta t_k) \\ 1 & -\Delta t_k & 0 & 0 \\ 0 & 0 & 1 & -\Delta t_k \\ 1 & 0 & 0 & 0 \\ 0 & 0 & 1 & 0 \end{bmatrix},$$

$$Y = \begin{bmatrix} y_{e,k-2}^c \\ y_{f,k-1}^c \\ y_{g,k}^c \end{bmatrix},$$

$$R = \begin{bmatrix} \sigma_w^2 & 0 & 0 & 0 & 0 & 0 \\ 0 & \sigma_w^2 & 0 & 0 & 0 & 0 \\ 0 & 0 & \sigma_w^2 & 0 & 0 & 0 \\ 0 & 0 & 0 & \sigma_w^2 & 0 & 0 \\ 0 & 0 & 0 & 0 & \sigma_w^2 & 0 \\ 0 & 0 & 0 & 0 & 0 & \sigma_w^2 \end{bmatrix},$$

$\sigma_w$ a is the standard deviation of the measured noise; at the same time, the existence probability of the new target is given as $\rho_\gamma^i = 0.9$, the state estimation of the new target at moment k−1 is given as $m_{\gamma,k-1}^i = (C_1^T C_1)^{-1} C_1^T Y$, where $$C_1 = \begin{bmatrix} 1 & -\Delta t_{k-1} & 0 & 0 \\ 0 & 0 & 1 & -\Delta t_{k-1} \\ 1 & 0 & 0 & 0 \\ 0 & 0 & 1 & 0 \\ 1 & \Delta t_k & 0 & 0 \\ 0 & 0 & 1 & \Delta t_k \end{bmatrix},$$

and the state estimation of the new target at moment k−2 is given as $m_{\gamma,k-2}^i = (C_2^T C_2)^{-1} C_2^T Y$ where $$C_2 = \begin{bmatrix} 1 & 0 & 0 & 0 \\ 0 & 0 & 1 & 0 \\ 1 & \Delta t_k & 0 & 0 \\ 0 & 0 & 1 & \Delta t_k \\ 1 & \Delta t_{k-1} + \Delta t_k & 0 & 0 \\ 0 & 0 & 1 & \Delta t_{k-1} + \Delta t_k \end{bmatrix}.$$

* * * * *